US012376218B2

(12) United States Patent
Nadler et al.

(10) Patent No.: US 12,376,218 B2
(45) **Date of Patent: *Jul. 29, 2025**

(54) CONSUMABLES FOR PROCESSING TORCHES

(71) Applicant: The ESAB Group Inc., North Bethesda, MD (US)

(72) Inventors: Michael Nadler, Wilmot, NH (US); Maximilian Dougherty, Bozeman, MT (US); Kevin Horner-Richardson, Cornish, NH (US); Auston Maynard, Thetford, VT (US); Andrew J. Raymond, Lebanon, NH (US)

(73) Assignee: THE ESAB GROUP, INC., North Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,413

(22) Filed: Oct. 26, 2023

(65) Prior Publication Data

US 2024/0074026 A1 Feb. 29, 2024

Related U.S. Application Data

(63) Continuation of application No. 17/167,338, filed on Feb. 4, 2021, now Pat. No. 11,839,015.

(51) Int. Cl.
*H05H 1/34* (2006.01)

(52) U.S. Cl.
CPC .................................... *H05H 1/34* (2013.01)

(58) Field of Classification Search
CPC .. H05H 1/02; H05H 1/26; H05H 1/28; H05H 1/32; H05H 1/34
USPC ....................................... 219/121.28–212.59
See application file for complete search history.

(56) References Cited

U.S. PATENT DOCUMENTS

| | | | |
|---|---|---|---|
| 3,832,513 | A | 8/1974 | Klasson |
| 4,701,590 | A | 10/1987 | Hatch |
| 4,940,877 | A | 7/1990 | Broberg |
| 5,132,512 | A | 7/1992 | Sanders et al. |
| 5,841,095 | A | 11/1998 | Lu et al. |

(Continued)

FOREIGN PATENT DOCUMENTS

| | | | |
|---|---|---|---|
| EP | 3473370 | A1 | 4/2019 |
| WO | 03089179 | A1 | 10/2003 |

(Continued)

OTHER PUBLICATIONS

Examination Report No. 1 from the Australian IP Office for Australian Patent Application No. 2022218120 dated May 24, 2024, 4 pages.

(Continued)

*Primary Examiner* — Sang Y Paik
(74) *Attorney, Agent, or Firm* — Edell, Shapiro & Finnan, LLC

(57) ABSTRACT

Consumables for cutting torches include a distributor, an electrode, and a nozzle. The distributor defines a plurality of ports that extend from an internal cavity of the distributor to an exterior surface of the distributor. The electrode is disposed within and irremovably, fixedly coupled to the distributor. The nozzle defines at least one set of passageways that direct gas into a gap defined between the electrode and the nozzle, the nozzle being irremovably, fixedly coupled to the distributor.

20 Claims, 25 Drawing Sheets

(56) References Cited

U.S. PATENT DOCUMENTS 5,886,315 A 3/1999 Lu et al.
6,163,008 A 12/2000 Roberts et al.
6,320,156 B1 11/2001 Yamaguchi et al.
6,424,082 B1 7/2002 Hackett et al.
6,614,001 B2 9/2003 Hackett et al.
6,717,096 B2 4/2004 Hewett et al.
6,847,009 B2 1/2005 Stuart et al.
6,888,092 B2 5/2005 Walters
6,888,093 B2 5/2005 Hardwick
6,919,526 B2 7/2005 Kinerson et al.
6,936,786 B2 8/2005 Hewett et al.
6,974,929 B2 12/2005 Walters
6,979,796 B1 12/2005 Hardwick
6,987,237 B2 1/2006 Walters
6,987,238 B2 1/2006 Horner-Richardson et al.
6,989,505 B2 1/2006 MacKenzie et al.
6,998,566 B2 2/2006 Conway et al.
7,005,600 B2 2/2006 Conway et al.
7,019,254 B2 3/2006 MacKenzie et al.
7,071,443 B2 7/2006 Conway et al.
7,112,759 B1 9/2006 Severance, Jr.
7,145,098 B2 12/2006 MacKenzie et al.
7,161,111 B2 1/2007 Schneider
7,256,366 B2 8/2007 Severance, Jr.
7,429,715 B2 9/2008 MacKenzie et al.
7,989,727 B2 8/2011 Twarog et al.
8,089,025 B2 1/2012 Sanders
8,153,927 B2 4/2012 Twarog et al.
8,395,076 B2 3/2013 Matus
8,624,150 B2 1/2014 Simek et al.
8,853,588 B2 10/2014 Mao et al.
8,866,038 B2 10/2014 Lindsay et al.
8,921,731 B2 12/2014 Krink et al.
8,981,253 B2 3/2015 Shipulski et al.
9,040,868 B2 5/2015 Leiteritz et al.
9,079,265 B2 7/2015 Reinke et al.
9,131,596 B2 9/2015 Conway et al.
9,138,824 B2 9/2015 Giese
9,144,882 B2 9/2015 Lindsay et al.
9,199,330 B2 12/2015 Hassan et al.
9,288,887 B2 3/2016 Norris et al.
9,395,715 B2 7/2016 Brandt et al.
9,457,419 B2 10/2016 Namburu
9,481,050 B2 11/2016 Brine et al.
9,560,732 B2 1/2017 Shipulski et al.
9,609,733 B2 3/2017 Severance, Jr.
9,642,236 B2 5/2017 Mather et al.
9,662,747 B2 5/2017 Darrow et al.
9,672,460 B2 6/2017 Hoffa et al.
9,686,848 B2 6/2017 Namburu
9,737,954 B2 8/2017 Hoffa et al.
9,781,816 B2 10/2017 Cook et al.
9,782,852 B2 10/2017 Mao et al.
9,883,575 B2 1/2018 Namburu
9,900,972 B2 2/2018 Mitra et al.
9,981,335 B2 5/2018 Sanders et al.
10,098,217 B2 10/2018 Chen et al.
10,129,969 B2 11/2018 Mitra et al.
10,194,516 B2 1/2019 Schulze et al.
10,194,517 B2 1/2019 Mitra et al.
10,278,274 B2 4/2019 Sanders et al.
10,321,551 B2 6/2019 Zhang et al.
10,456,855 B2 10/2019 Sanders et al.
10,582,605 B2 3/2020 Zhang et al.
10,713,448 B2 7/2020 Hoffa et al.
11,839,015 B2 * 12/2023 Nadler ..................... H05H 1/34
2002/0117483 A1 8/2002 Jones et al.
2004/0011771 A1 1/2004 Horner-Richardson et al.
2005/0109736 A1 5/2005 Matus
2005/0109738 A1 5/2005 Hewett et al.
2006/0016789 A1 1/2006 MacKenzie et al.
2006/0102606 A1 5/2006 Twarog
2007/0044449 A1 3/2007 O'Brien et al.
2008/0217305 A1 9/2008 Sanders
2011/0210101 A1 9/2011 Smallwood
2012/0298635 A1 11/2012 Norris et al.
2013/0043222 A1 2/2013 Leiteritz et al.
2013/0068732 A1 3/2013 Watson et al.
2013/0087537 A1 4/2013 Barnett et al.
2013/0263420 A1 10/2013 Shipulski
2013/0264317 A1 10/2013 Hoffa et al.
2013/0264320 A1 10/2013 Shipulski et al.
2014/0021172 A1 1/2014 Sanders et al.
2014/0061170 A1 3/2014 Lindsay et al.
2014/0069895 A1 3/2014 Brine et al.
2015/0319835 A1 11/2015 Sanders et al.
2015/0319836 A1 11/2015 Sanders
2015/0332071 A1 11/2015 Hoffa et al.
2016/0050740 A1 2/2016 Zhang et al.
2016/0165711 A1 6/2016 Zhang et al.
2016/0165712 A1 6/2016 Zhang et al.
2016/0174353 A1 6/2016 Mitra
2016/0228972 A1 8/2016 Jogdand et al.
2017/0042011 A1 2/2017 Sanders et al.
2017/0042012 A1 2/2017 Sanders et al.
2017/0042013 A1 2/2017 Sanders et al.
2017/0042014 A1 2/2017 Sanders et al.
2017/0181261 A1 6/2017 Roberts et al.
2017/0188445 A1 6/2017 Yamaguchi et al.
2017/0291244 A1 10/2017 Peters
2017/0295635 A1 10/2017 Peters et al.
2017/0295637 A1 10/2017 Peters et al.
2018/0007773 A1 1/2018 Twarog et al.
2018/0084631 A1 3/2018 Peters et al.
2018/0178310 A1 6/2018 Jogdand et al.
2018/0228013 A1 8/2018 Zhang et al.
2018/0232545 A1 8/2018 Hoffa et al.
2018/0250765 A1 9/2018 Sanders et al.
2018/0257164 A1 9/2018 Zhang et al.
2019/0009356 A1 1/2019 Severance, Jr.
2019/0261501 A1 8/2019 Zhang et al.
2019/0269002 A1 8/2019 Zhang et al.
2020/0023456 A1 1/2020 Sanders et al.
2020/0055138 A1 2/2020 Hoffa et al.
2020/0070275 A1 3/2020 Sanders et al.
2020/0077504 A1 3/2020 Duan et al.

FOREIGN PATENT DOCUMENTS

WO 2015172140 A1 11/2015
WO 2015172142 A1 11/2015
WO 2018157052 A1 8/2018

OTHER PUBLICATIONS

Notification of Transmittal of International Search Report and Written Opinion including International Search Report and Written Opinion for International Application No. PCT/US2022/014688 dated May 25, 2022, 14 pages.
Office Action from the Canadian Patent Office for Canadian Patent Application No. 3,207,308 dated Nov. 28, 2024, 3 pages.

* cited by examiner

CONSUMABLES FOR PROCESSING TORCHES

CROSS REFERENCE

This application is a continuation of U.S. patent application Ser. No. 17/167,338, entitled "CONSUMABLES FOR PROCESSING TORCHES," filed Feb. 4, 2021, which is hereby incorporated in its entirety for all purposes.

TECHNICAL FIELD

The present disclosure is directed toward components for welding and cutting torches and, in particular, to consumable components for welding and/or cutting torches.

BACKGROUND

Many welding and cutting torches, such as plasma cutting torches, can receive a variety of consumable components, such as tips/nozzles, electrodes, shields, etc. Generally, consumables, such as electrodes, tips/nozzles, shields, etc., have a limited lifespan and only last for a certain amount of cuts or welds before a user must replace them. Thus, consumables with longer lifespans may save time for a user since a user can continue cutting or welding operations without changing consumables. Additionally, consumables with longer lifespans may provide costs savings for users since a user will not need to purchase replacement consumables as frequently. Thus, consumables with improved lifespans are continuously desired.

Different factors impact the lifespan of a consumable. For example, consumables that are exposed to slag and direct heat from an arc may wear faster than components that are protected or indirectly exposed (e.g., disposed interiorly of another component) from the slag and heat. As another example, if a consumable moves (e.g., slides or translates) before, during, or after processing operations and/or is delicate, small imperfections may render the consumable unusable (i.e., end the lifespan of the consumable). For example, small imperfections may create unacceptable movement patterns and/or unacceptable tolerancing between parts, rendering a consumable unable to perform its intended task. Thus, movable consumables may, in at least some instances, have reduced lifespans as compared to stationary consumables. This may be particular true for electrodes, which often strike an arc and then must support an arc from a precise location (e.g., from a small emissive insert included at its distal end). As still another example, an amount of cooling acting on a consumable may significantly impact consumable life.

Moreover, in many conventional welding and/or cutting torches, a consumable set includes a number of individual consumable parts that often must be disassembled or assembled to replace one or more consumable parts. This requires an end user to inventory a wide variety of parts and may make replacement of even a single consumable a timely and/or difficult task. For example, if wear damages an electrode, it might be difficult to remove the electrode from the remaining consumables, replace the electrode, and reassemble the set of consumables. Moreover, in at least some instances, it may be difficult to decipher which consumable of a set of consumables requires replacement. Thus, consumable sets that can be easily installed onto a torch head are continuously desired.

SUMMARY

The present disclosure is directed towards consumables for cutting torches. The consumables may be provided individually, in a unitary cartridge that is non-serviceable and formed from components irremovably connected to each other, and/or in sub-cartridges that are each unitary/non-serviceable, but connectable to other components or sub-cartridges to form a complete consumable cartridge.

In at least some embodiments, the consumables in the unitary cartridge and/or sub-cartridges presented herein are fixed or stationary and, thus, are precisely aligned and arranged with respect to other consumables in the unitary cartridge and/or sub-cartridges, which may extend the lifespan of the individual consumables. Alternatively, one or more components of a unitary cartridge and/or sub-cartridges presented herein may include a movable component, such as a movable arc initiator, but may include a fixed tip and fixed electrode, which may extend the lifespan of these important consumable components, which are often the consumable components with the shortest lifespans. Still further, in yet further embodiments, the electrode or the tip of a unitary cartridge and/or sub-cartridges presented herein may be movable during arc initiation, but may be otherwise secured within the cartridge so that an end user need not service or assemble the cartridge or sub-cartridge.

According to one example embodiment, a set of consumables for a plasma arc torch includes a distributor, a nozzle, and a locking ring. The distributor defines a plurality of ports that extend from an internal cavity of the distributor to an exterior surface of the distributor. The nozzle includes a first set of passageways and a second set of passageways. The first set of passageways extend from an internal cavity of the nozzle to an exterior surface of the nozzle. The second set of passageways that extend from the exterior surface of the nozzle to an undercut portion of the nozzle. The locking ring is configured to irremovably secure the distributor to the nozzle. Thus, with only three components, the set of consumables may form a shield gas pathway and a plasma gas pathway within consumables that are irremovably secured together and non-serviceable. Since the consumables are irremovably secured together, each pathway may be precisely contoured and oriented.

In at least some of the embodiments, the set of consumables also includes an electrode irremovably connected to the distributor. Additionally or alternatively, the set of consumables may include a stationary arc initiator seated in the distributor and positioned to extend into a gap between the nozzle and an electrode disposed within the nozzle. Embodiments with a stationary arc initiator may form a cartridge or sub-cartridge that is entirely stationary and, thus, may extend the lifespan of consumables.

In some embodiments, the nozzle includes a proximal portion and a distal portion and the first set of passageways and the second set of passageways extend through the proximal portion. In some of these embodiments, the distal portion defines an orifice that provides an exit from the internal cavity of the nozzle, the first set of passageways define a gas pathway to the orifice, and the second set of passageways define a gas pathway that flows gas over an exterior surface of the distal portion and bypasses the orifice. Additionally or alternatively, the undercut portion extends longitudinally into a bottom surface of the proximal portion of the nozzle.

In some embodiments, the distributor defines an upper shoulder, the nozzle defines a lower shoulder and the locking ring further comprises an upstream end and a downstream end. The upstream end is configured to engage the upper shoulder and the downstream end is configured to engage the lower shoulder. Thus, the locking ring may mechanically secure the distributor and the nozzle while providing fluid passageways between exteriors of these components and providing electrical connections for such components if needed. In some of these embodiments, the upstream end defines a first opening with a first diameter and the downstream end defines a second opening with a second diameter, the first diameter being smaller than the second diameter. Additionally or alternatively, the lower shoulder of the nozzle defines a boundary of the undercut portion and the downstream end of the locking ring is configured to extend over the lower shoulder to the boundary.

Still further, in some embodiments, a proximal end of the nozzle defines a seat and the locking ring is configured to compress the distributor into the seat. Additionally or alternatively, the set of consumables may also include a shield cup configured to mechanically connect the set of consumables to an operative end of a torch and electrically connect the nozzle to electrical conductors in the torch.

According to another example embodiment, a set of consumables for a plasma arc torch includes a distributor, an electrode, and a nozzle. The distributor defines a plurality of ports that extend from an internal cavity of the distributor to an exterior surface of the distributor. The electrode is disposed within and irremovably, fixedly coupled to the distributor. The nozzle defines at least one set of passageways that direct gas into a gap defined between the electrode and the nozzle and is irremovably, fixedly coupled to the distributor. Since the electrode and the nozzle are each irremovably, fixedly coupled to the distributor, these consumables may be precisely positioned and aligned with respect to each other, which may maximize the lifespans of these components.

In at least some of these embodiments, the set of consumables also includes a locking ring that extends around a proximal end of the distributor and a distal end of the nozzle to irremovably, fixedly couple the distributor to the nozzle. For example, the distributor may define an upper shoulder, the nozzle may define a lower shoulder and the locking ring may include an upstream end configured to engage the upper shoulder and a downstream end configured to engage the lower shoulder.

As mentioned, in at least some embodiments, the electrode is stationary. Additionally or alternatively, the set of consumables may include a stationary arc initiator seated in the distributor and positioned to extend into a gap between the electrode and the nozzle. Embodiments with a stationary arc initiator may form a cartridge or sub-cartridge that is entirely stationary and, thus, may extend the lifespan of consumables.

Still further, in some embodiments, the set of consumables may include a shield cup configured to mechanically connect the set of consumables to an operative end of a torch and electrically connect the nozzle to electrical conductors in the torch. Additionally, some embodiments with a shield cup may also include a shield. The shield and the shield cup can collectively surround the nozzle to protect the nozzle from splatter.

According to yet another example, a set of consumables for a plasma arc torch includes a first sub-cartridge and a second sub-cartridge. The first sub-cartridge includes a distributor, an electrode, and a nozzle. The distributor defines a plurality of ports that extend from an internal cavity of the distributor to an exterior surface of the distributor. The electrode is disposed within and irremovably, fixedly coupled to the distributor. The nozzle defines at least one set of passageways that direct gas into a gap defined between the electrode and the nozzle and is irremovably, fixedly coupled to the distributor. The second sub-cartridge includes a shield and a shield cup. The shield is configured to cover a distal end of the nozzle. The shield cup is irremovably, fixedly coupled to the shield. The shield and shield cup define a seating cavity configured to receive the first sub-cartridge and the shield cup includes connectors that can connect the second sub-cartridge, with the first sub-cartridge seated therein, to an operative end of a torch. Thus, the first and second sub-cartridges may form a single cartridge that is non-serviceable and connectable to or removable from a torch in a single action.

In some embodiments, shield cup includes a first connector and a second connector. The first connector electrically connects the shield to one or more electrical conductors in the torch. The second connector electrically connects the nozzle to one or more electrical conductors in the torch. Thus, when the shield cup is mechanically connected to a torch (e.g., in a single action), the cartridge may be electrically connected to the torch in a manner that allows arc initiation.

Other systems, methods, features and advantages will be, or will become, apparent to one with skill in the art upon examination of the following figures and detailed description. All such additional systems, methods, features and advantages are included within this description, are within the scope of the claimed subject matter.

BRIEF DESCRIPTION OF THE SEVERAL VIEWS OF THE DRAWINGS

The consumables for a plasma arc torch presented herein may be better understood with reference to the following drawings and description. It should be understood that the elements in the figures are not necessarily to scale and that emphasis has been placed upon illustrating the principles of the consumables. In the figures, like-referenced numerals designate corresponding parts throughout the different views.

DETAILED DESCRIPTION

Consumables for cutting and/or welding torches are presented herein. The consumables may be provided individually or packaged into one or more consumable cartridges. When packaged in a consumable cartridge, the consumables may be irremovably coupled together so that consumables included therein are non-serviceable. That is, the irremovable couplings may create a unitary cartridge that cannot be disassembled. Thus, a unitary consumable cartridge can be installed onto a torch or removed from a torch with a single action. Alternatively, the consumables presented herein may be irremovably coupled to other components to form sub-cartridges that may be removably or irremovably coupled to additional consumables or sub-cartridges to form a cartridge. The resulting cartridge may still be coupleable to a torch with a single action.

Regardless of whether the consumable presented herein are part of a unitary cartridge, in at least some embodiments, the consumables do not move with respect to each other before, during, or subsequent to a processing operations, including during arc initiation. That is, the consumables may be stationary. This may ensure that the consumables are properly aligned, secured, and oriented with respect to each other which, in turn, may maximize the lifespan of the consumables. By comparison, consumables that move precisely with respect to other consumables may fail (i.e., reach the end of their lifespan) when wear prevents consistent execution of a precise movement and/or reduces the functionality of a specific component (e.g., if wear reduces the functionality of a spring). The consumables presented herein may also be more robust and less prone to manufacturing defects as compared to consumables that are configured to execute precise movements and/or include components configured to execute precise movements.

Figure 1A:
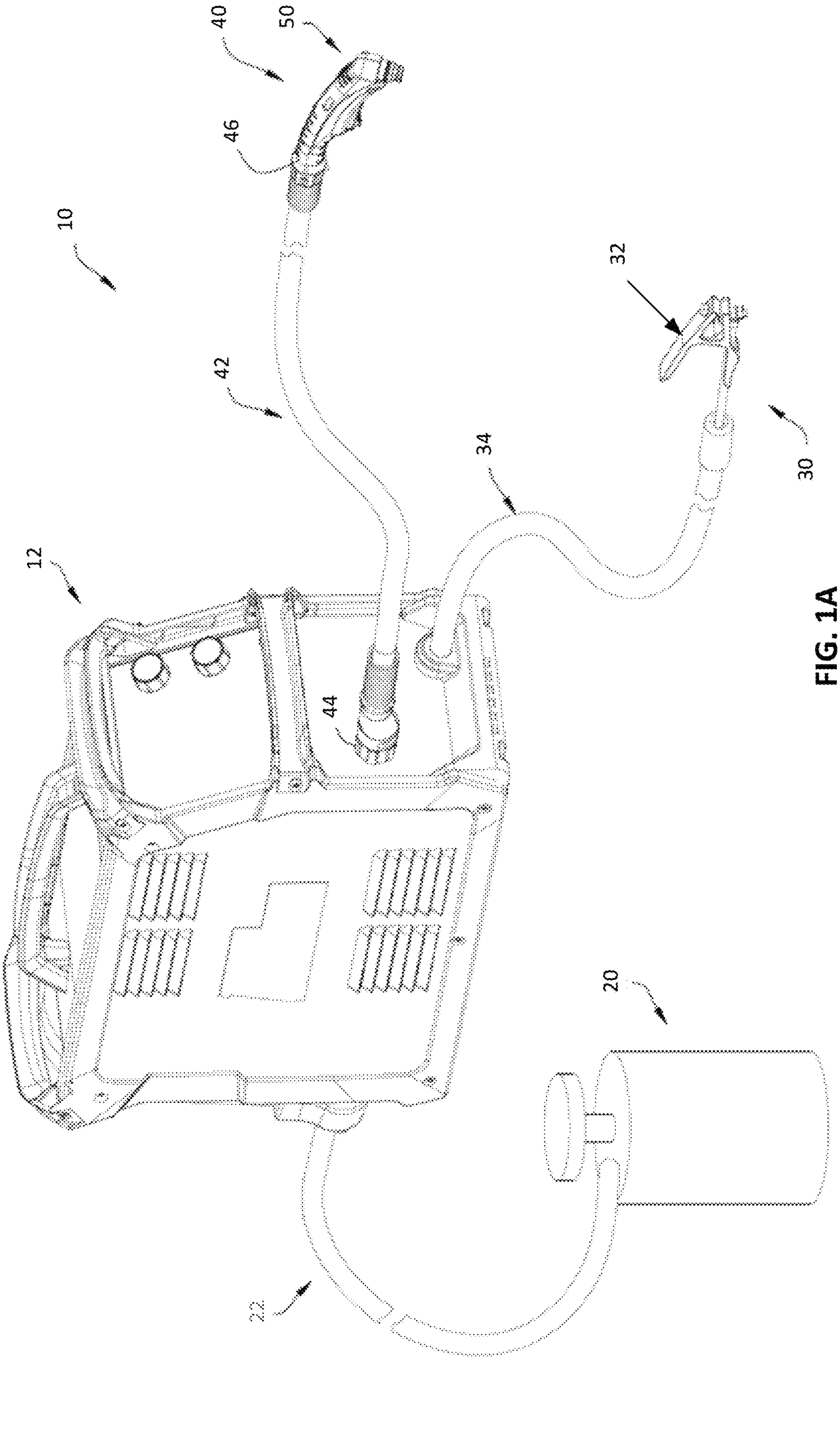
FIG. 1A is a perspective view of a manual cutting system including a power source and torch assembly with which the consumables presented herein may be utilized, according to an example embodiment of the present disclosure.

FIG. 1A illustrates an example embodiment of a manual cutting system 10 that may utilize the consumable components presented herein. At a high-level, the manual cutting system 10 includes a power supply 12 and a torch assembly 40. The power supply 12 is configured to supply (or at least control the supply of) power and gas to a torch 50 included in the torch assembly 40 via torch lead 42 (also referred to as cable hose 42). For example, the power supply 12 may meter a flow of gas received from a gas supply 20, which the power supply 12 receives via cable hose 22, before or as the power supply 12 supplies gas to the torch 50 via cable hose 42.

The manual cutting system 10 also includes a working lead assembly 30 with a grounding clamp 32 that is connected to the power supply by a work lead 34 (also referred to as cable hose 34). As illustrated, cable hose 22, cable hose 34, and cable hose 42 may each be any length. Moreover, each end of cable hose 22, cable hose 34, and cable hose 42 may be connected to components of the manual cutting system 10 via any connectors now known or developed hereafter (e.g., via releasable connectors). For example, torch 50 may be connected to a distal end of cable hose 42 via a quick disconnect connector 46 and power supply 12 may be connected to a proximal end of cable hose 42 via a quick disconnect connector 44.

Figure 1B:
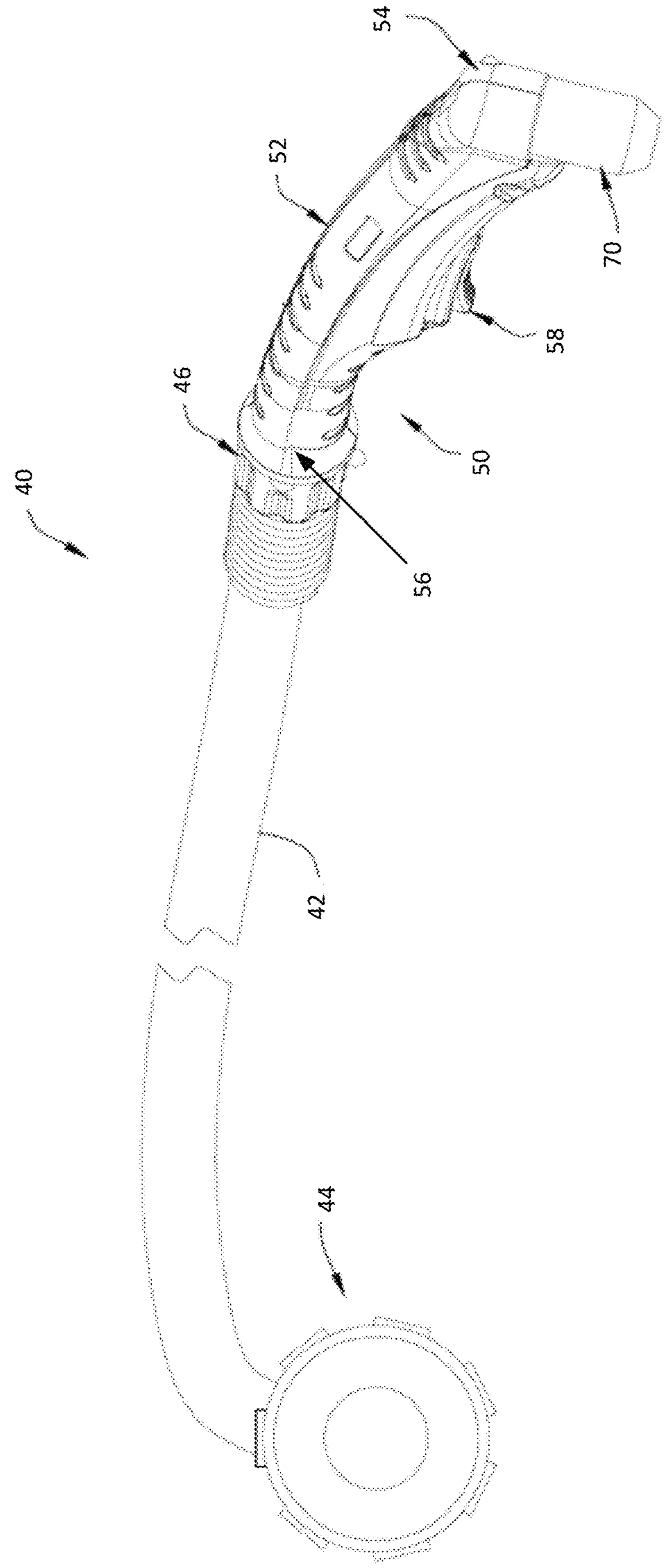
FIG. 1B is a perspective of the torch assembly of FIG. 1.

FIG. 1B illustrates the torch assembly 40 of FIG. 1A independently from the power supply 12. As can be seen, the torch 50 includes a torch body 52 that extends from a first end 56 (e.g., a connection end 56) to a second end 54 (e.g., an operating or operative end 54). The torch body 52 may also include a trigger 58 that allows a user to initiate cutting operations in any manner now known or developed hereafter (e.g., in a 2T or 4T mode). As mentioned above, the connection end 56 of the torch body 52 may be coupled (in any manner now known or developed hereafter) to one end of lead 42 Meanwhile, the operative end 54 of the torch body 52 may receive interchangeable components, such as consumable components that facilitate cutting operations. The consumable stack presented herein, which is depicted installed on torch 50 in FIG. 1B, is generally referred to as consumable stack 70 in FIG. 1B; however, the depiction shown in FIG. 1B is merely representative of a consumable stack that includes the features presented herein.

Figure 1C:
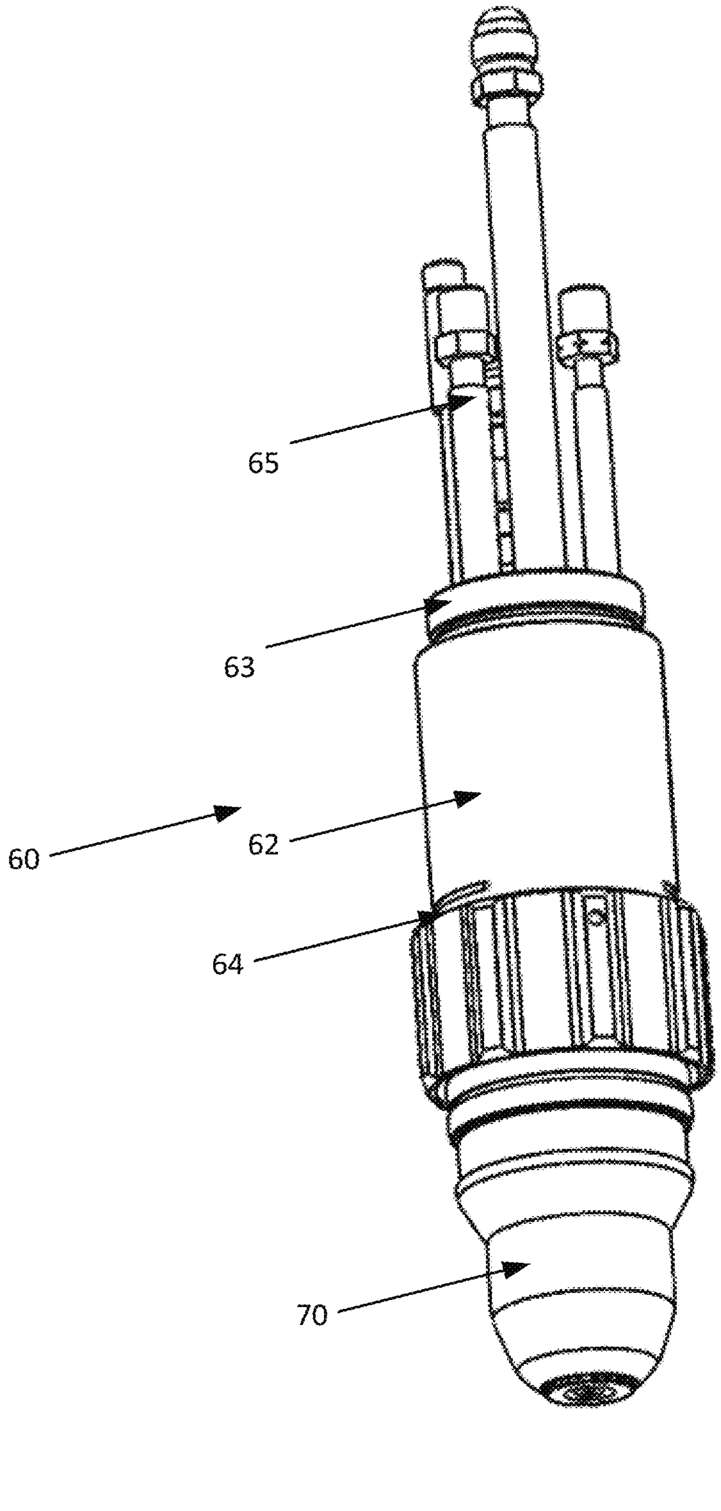
FIG. 1C is a perspective view of an automated cutting head with which the consumables presented herein may be utilized, according to an example embodiment of the present disclosure.

FIG. 1C illustrates an example embodiment of an automated cutting head 60 that may utilize the consumable components presented herein. As can be seen, the cutting head 60 includes a body 62 that extends from a first end 63 (e.g., a connection end 63) to a second end 64 (e.g., an operating or operative end 64). The connection end 63 of the body 62 may be coupled (in any manner now known or developed hereafter) to an automation support structure (e.g., a cutting table, robot, gantry, etc.) and conduits 65 extending therefrom may be coupled to like conduits in the automation support structure to connect the automated cutting head 60 to a power supply, a gas supply, a coolant supply, and/or any other components supporting automated cutting operations. Meanwhile, the operative end 64 of the body 62 may receive interchangeable components, including consumable components that facilitate cutting operations. Again, the consumable stack 70 depicted in FIG. 1C is merely representative of a consumable stack that includes the features presented herein (like the stack 70 depicted in FIG. 1B).

For simplicity, FIGS. 1A, 1B, and 1C do not illustrate an interior of torch body 52 or body 62. However, it is to be understood that any unillustrated components that are typically included in a torch, such as components that facilitate welding or cutting operations, may (and, in fact, should) be included in a torch configured in accordance with an example embodiment of the present invention. Additionally, none of FIGS. 1A, 1B, and 1C, nor the remaining figures, illustrate connections portions of the bodies 52/62 in detail; however, it should be understood that the consumables presented herein may be coupled to a torch body 52/62 that includes features configured to mate with features of the consumables, examples of which are described in detail below.

Consumable Cartridges

Figure 2A:
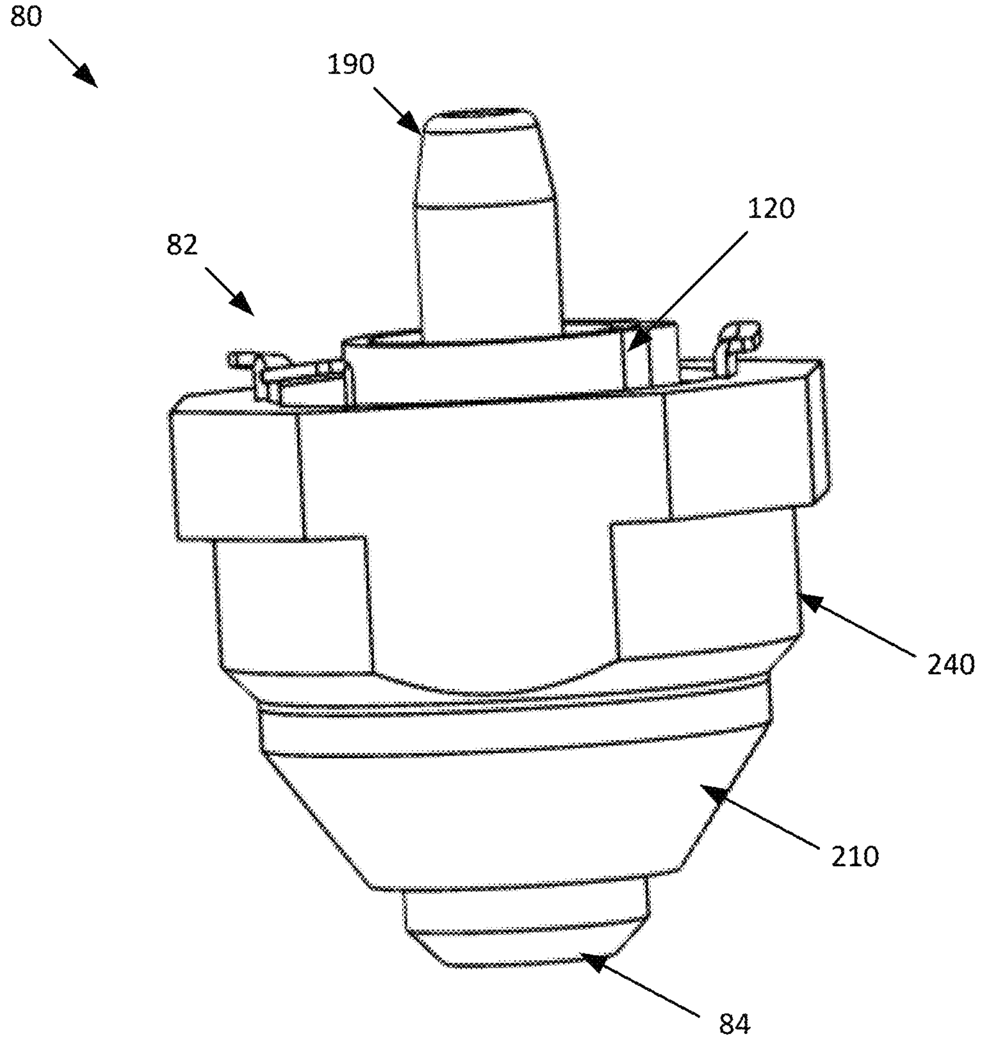
FIG. 2A is a side perspective view of a consumable cartridge formed from example embodiments of the consumables presented herein.
Figure 2B:
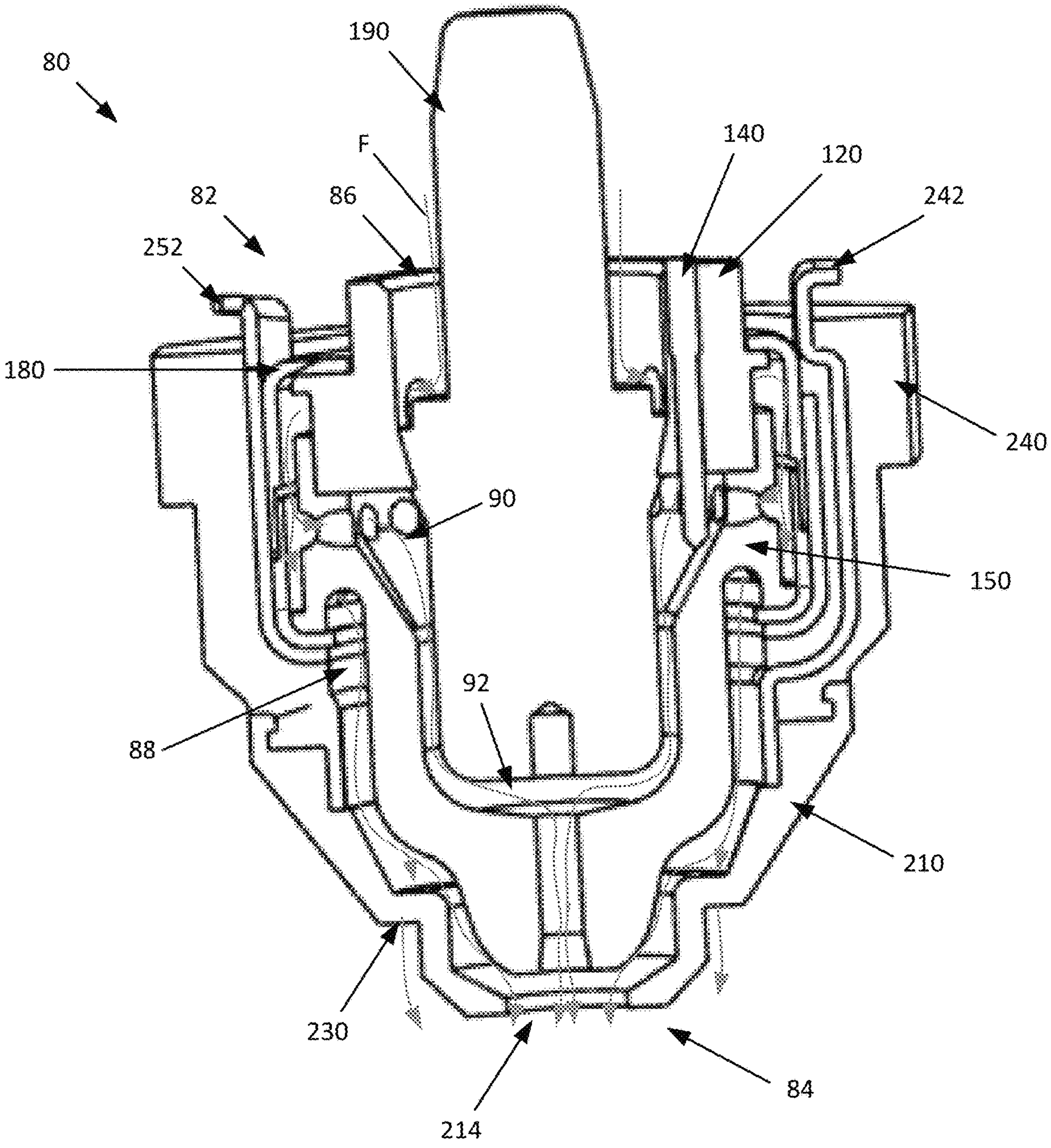
FIG. 2B is a side sectional view of the consumable cartridge of FIG. 2A.

Now turning to FIGS. 2A and 2B, these figures provide a perspective view and sectional view of a first example embodiment of a consumable cartridge 80 formed from the consumables presented herein. The consumable cartridge 80 includes a distributor 120, an arc initiator 140, a nozzle 150, a locking ring 180, an electrode 190, a shield 210, and a shield cup 240. However, this example is not intended to imply that consumable cartridge 80 cannot include additional components in combination with distributor 120, arc initiator 140, nozzle 150 (also referred to as tip 150), locking ring 180, electrode 190, shield 210, and shield cup 240. For example, the consumable cartridge 80 might also include gas management components, mechanical components, magnetic components, and/or any other components to help initiate an arc. Some example additional components are described in further detail below in connection with at least FIGS. 14-20. Moreover, one or more of distributor 120, arc initiator 140, nozzle 150, locking ring 180, electrode 190, shield 210, and shield cup 240 might be modified in different embodiments of consumable cartridge 80.

In at least some embodiments, the consumable components of consumable cartridge 80 are interconnected in an irremovable manner so that the consumable cartridge 80 is a unitary, non-serviceable cartridge. In these instances, consumable cartridge 80 can be installed onto (or removed from) a torch body (e.g., body 52 or body 62) with a single action and can be disposed of when one or more of the consumables included therein needs to be replaced (e.g., at the end of one consumable's lifespan). However, in other embodiments, consumable cartridge 80 may be formed from one or more "sub-cartridges" (i.e., cartridges that are combinable with other consumables and/or cartridges) and/or one or more individual consumables. That is, consumable cartridge 80 may be formed from two sub-cartridges, two sub-cartridges and one individual (i.e., loose) consumable, or any other combination of components.

Additionally, in some instances, each of the consumables included in consumable cartridge 80 may be fixed in place once interconnected. That is, consumable cartridge 80 may be comprised of stationary consumables, insofar as each of the aforementioned consumables may be stationary within respect to other consumables included in consumable cartridge 80 once the consumable cartridge 80 is fully assembled. Alternatively, some embodiments may include a movable component that initiates an arc, but the electrode 190 and/or the nozzle 150 may be fixed and stationary, which may be important since the tip 150 and electrode 190 are the primary components involved in arc initiation and plasma generation (especially the electrode 190) and may experience considerable wear and/or and poor cutting performance/characteristics if improperly aligned and/or positioned. That said, in still other embodiments, one or more consumable components of consumable cartridge 80, including the electrode 190 and/or the nozzle 150, may be movable within consumable cartridge 80.

In the depicted embodiment, consumable cartridge 80 extends from a proximal end 82 to a distal end 84. The proximal end 82 defines a fluid entryway 86 and the distal end 84 defines one or more openings that allow fluid to exit the consumable cartridge 80. The fluid entryway 86 is primarily defined by the distributor 120 and is designed to receive a fluid "F" (e.g., gas) from a corresponding conduit in a torch body (e.g., torch body 52 or 62). Meanwhile, in the depicted embodiment, the shield 210 defines a central orifice 214 surrounded by a set of holes 230 that allow fluid to exit the consumable cartridge 80.

More specifically, in the depicted embodiment, the electrode 190 is seated within the distributor 120 to force fluid F entering the fluid entryway 86 to flow radially outwards within the consumable cartridge 80. Then, the locking ring 180 works with the nozzle 150 and the distributor 120 to define an annular, exterior axial channel 87 that guide the fluid F towards a first fluid path 88 and a second fluid path 90. The first fluid path 88 creates a flow of shielding fluid (e.g., shield gas) between the nozzle 150 and both the shield 210 and the shield cup 240. The second fluid path 90 directs fluid F into a gap between the nozzle 150 and electrode 190, towards the plasma chamber 92 to supply fluid towards an arc to constrain the arc and generate a stream of plasma (via ionization of the fluid F) that can exit orifice 214 (subsequent to exiting an orifice of nozzle 150). Fluid F directed along the first fluid path 88 may exit the consumable cartridge 80 via holes 230 and/or orifice 214 to constrain and shield a transferred arc and/or plasma.

The proximal end 82 of the consumable cartridge 80 also includes connectors that mechanically and electrically connect the consumable cartridge 80 to corresponding connectors included in a torch body (e.g., torch body 52 or 62). Specifically, in the depicted embodiment, the electrode 190, a first connector 242 of the shield cup 240, and a second connector 252 of the shield cup 240 protrude from the proximal end 82 of the consumable cartridge 80. The first connector 242 and the second connector 252 can mechanically couple the consumable cartridge 80 to a torch body (e.g., torch body 52 or 62). For example, the first connector 242 and the second connector 252 may lock onto corresponding features of a torch body (e.g., torch body 52 or 62) via a partial rotation locking arrangement. However, first connector 242 and second connector 252 are merely examples, and in other embodiments, the consumable cartridge 80 may be coupled to a torch body in any manner now known or developed hereafter, including via threading, a detent arrangement, a snap fit, a friction fit, etc.

Additionally, connector 242, connector 252, and electrode 190 may electrically connect the consumable cartridge 80 to a torch body (e.g., torch body 52 or 62). First connector 242 connects the nozzle 150 to an anodic element included in a torch body (e.g., torch body 52 or 62) and/or to ground while second connector 252 may separately ground the shield 210. Meanwhile, the electrode 190 may connect to a cathodic element included in a torch body (e.g., torch body 52 or 62) to provide negative potential to the electrode 190. The exact electrical connections may depend on whether a pilot arc may is struck between the nozzle 150 and the electrode 190 prior to transferring an arc to a workpiece (or, for example, if the cartridge utilizes a scratch start).

Figure 3:
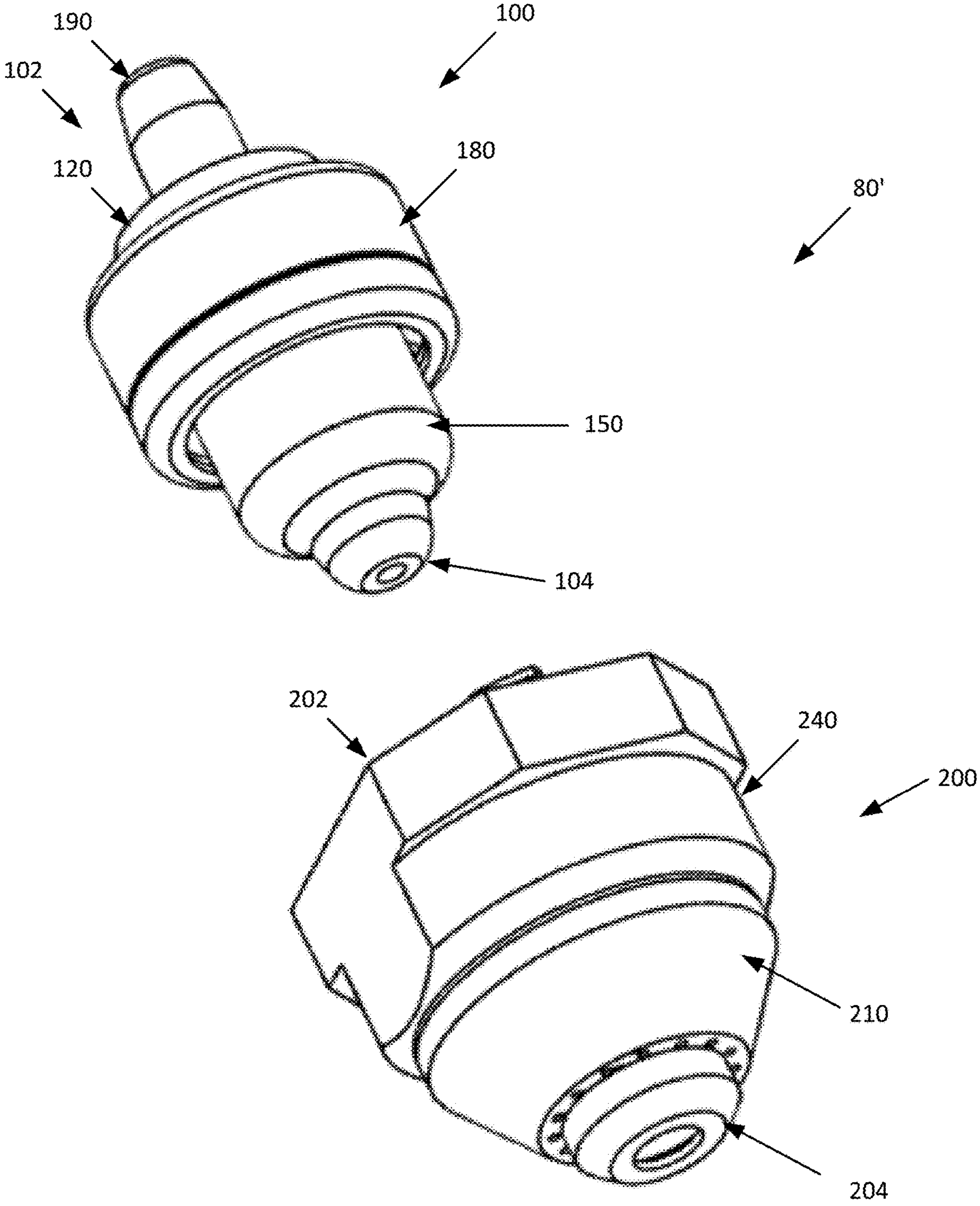
FIG. 3 is a side perspective view of two consumable cartridges, or consumable sub-cartridges, that can form the consumable cartridge of FIG. 2A, according to an example embodiment.

Now turning to FIG. 3, as mentioned, in some instances, a consumable cartridge formed from the consumables presented herein is formed from one or more sub-cartridges, alone or in combination with individual consumables. FIG.

3 illustrates an example embodiment of a consumable cartridge 80' formed from two sub-cartridges: sub-cartridge 100 and sub-cartridge 200 (also referred to herein as "cartridges" 100 and 200). Sub-cartridge 100 includes the distributor 120, the arc initiator 140, the nozzle 150, the locking ring 180, and the electrode 190. Sub-cartridge 200 includes the shield 210 and the shield cup 240.

In the depicted embodiment, sub-cartridge 100 is removably coupleable to sub-cartridge 200. For example, a distal end 104 of sub-cartridge 100 may be inserted into a proximal end 202 of sub-cartridge 200 (towards distal end 204) and the internal geometry of sub-cartridge 200 may naturally seat and align sub-cartridge 100 therein. In some embodiments, the sub-cartridge 200 may also include features that secure sub-cartridge 100 therein removably or irremovably, such as detents, friction fittings, threading etc. Either way, the consumable cartridge 80' may be installed onto a torch body (e.g., torch body 52 or 62) by seating sub-cartridge 100 within sub-cartridge 200 and then installing cartridge 80' onto a torch body (e.g., torch body 52 or 62). Alternatively, a proximal end 102 of sub-cartridge 100 may be attached to the torch body and then sub-cartridge 200 may be installed over and around sub-cartridge 100 to form cartridge 80' on a torch.

Regardless of how consumable cartridge 80' is assembled, collectively, the components of sub-cartridge 100 and sub-cartridge 200 define similar (if not identical) features, connections, and flow paths to the features, connections, and flow paths of consumable cartridge 80. Thus, any description of features, connections, and flow paths of consumable cartridge 80 included herein, aside from description of consumable cartridge 80 as a unitary cartridge with irremovably components, may apply to consumable cartridge 80'.

First Consumable Sub-Cartridge

Figure 4:
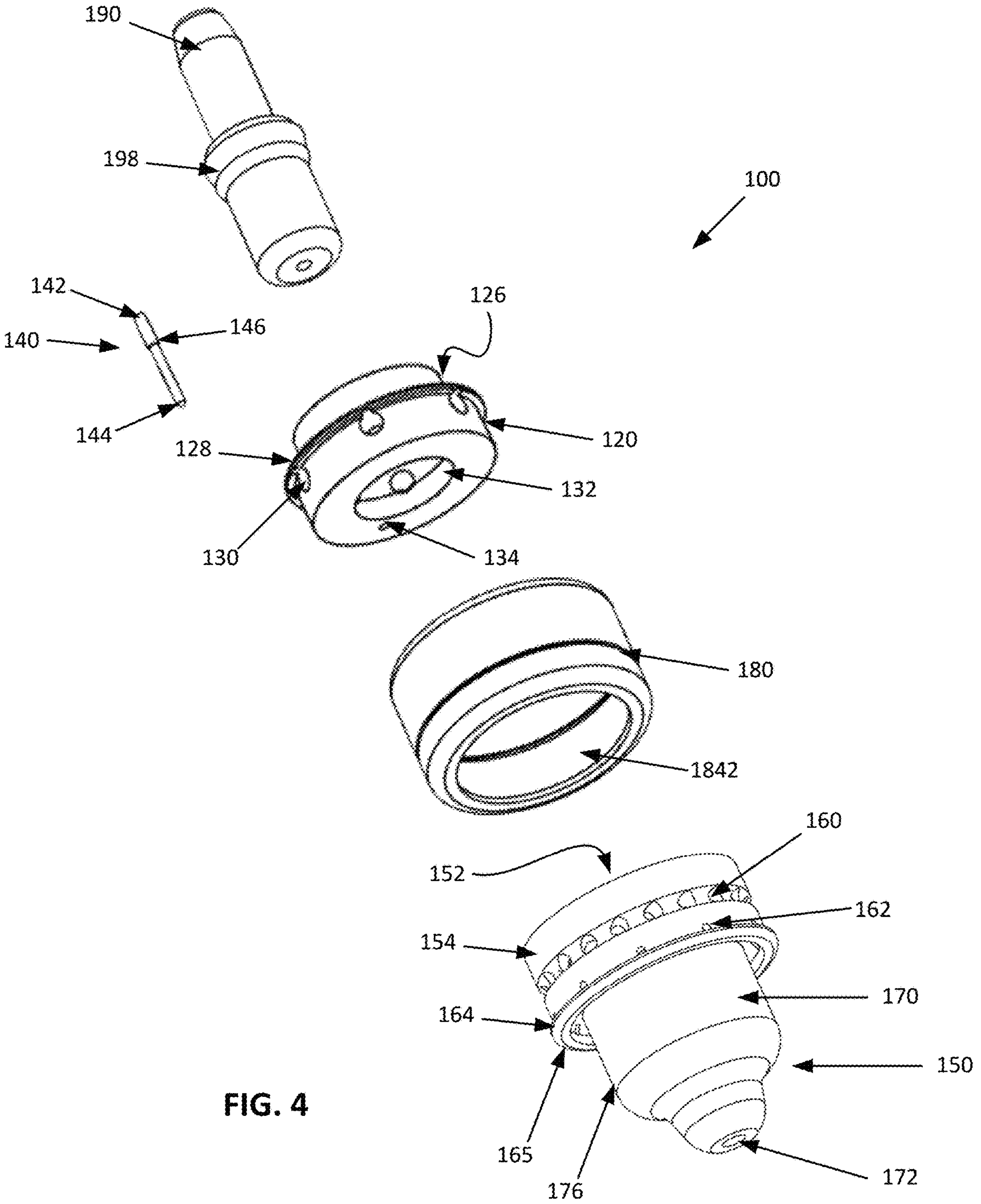
FIG. 4 is an exploded view of a first consumable sub-cartridge from FIG. 3, according to an example embodiment.
Figure 5:
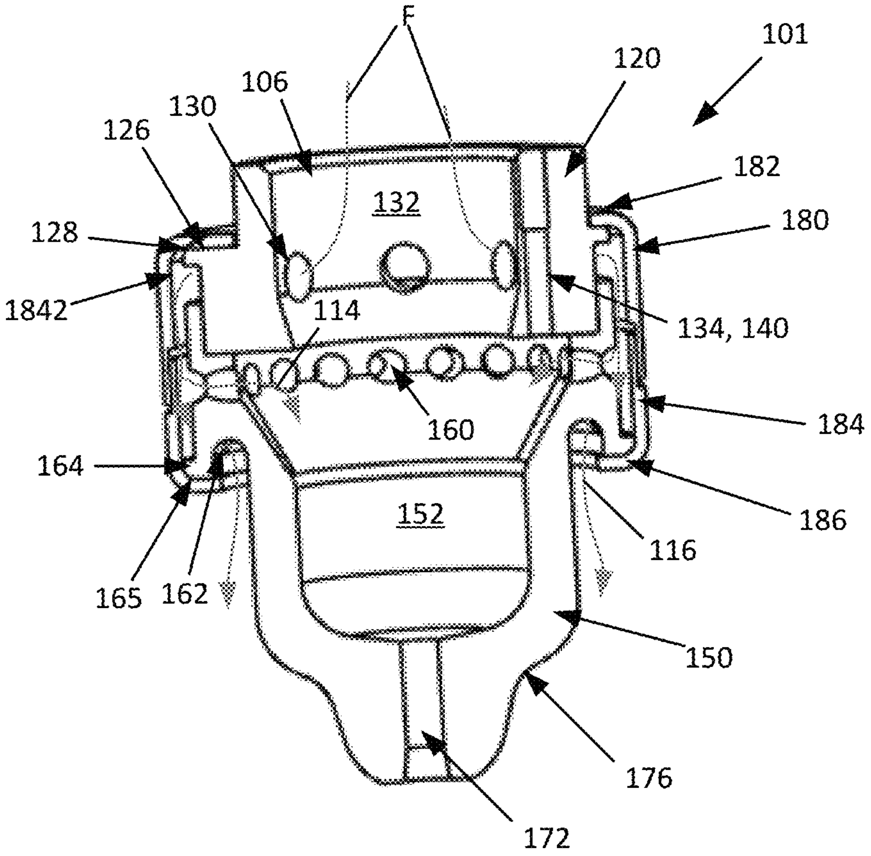
FIG. 5 is a side sectional view of a sub-cartridge that may be used to form the consumable sub-cartridge of FIG. 4, according to an example embodiment.

Now turning to FIGS. 4-9C, these Figures depict one or more of the components included in sub-cartridge 100. As mentioned above, in the depicted embodiment, sub-cartridge 100 includes a distributor 120, an arc initiator 140, a tip/nozzle 150, a locking ring 180, and an electrode 190. In some embodiments, each of these components may be manufactured separately and irremovably coupled together to form sub-cartridge 100. Alternatively, one or more of these components may be packaged individually and may be removably coupleable to other components of sub-cartridge 100. To illustrate this, FIG. 4 provides an exploded view of the components included in sub-cartridge 100, FIG. 5 provides a view of a sub-cartridge 101 that may be used to form sub-cartridge 100, and FIGS. 6A-9C depict individual components that may be used to form cartridge 80, sub-cartridge 100, and/or sub-cartridge 101. Notably, in FIG. 5, sub-cartridge 101 includes the distributor 120, the arc initiator 140, the tip 150, and the locking ring 180, while the electrode 190 is provided separately and may be removably or irremovably coupled thereto (e.g., by an end user)

As is shown in FIGS. 4 and 5, to assemble sub-cartridge 100 or sub-cartridge 101, the distributor 120 is seated in a distributor seat 1542 defined by the tip 150. Then, the locking ring 180 is secured around the distributor 120 and the tip 150, irremovably securing the distributor 120 to the tip 150. For example, the locking ring 180 may be swaged onto the distributor 120 and the tip 150. Alternatively, the locking ring 180 may include two pieces that are joined together once mounted on the distributor 120 and the tip 150, such as via a welding process, to irremovably coupled the distributor 120 to the tip 150. As still another example, the locking ring 180 could be formed around the distributor 120 and the tip 150 with an additive manufacturing process (e.g., three dimensional printing).

Regardless of how the locking ring 180 is formed/installed, the locking ring 180 can be secured against a radial flange 128 included on the distributor 120 and a radial flange 164 included on the tip 150. More specifically, an upstream end 182 of locking ring 180 may engage an upper seating surface 126 defined by the radial flange 128 of the distributor 120 and a downstream end 186 of locking ring 180 may engage a lower seating surface 165 defined by the radial flange 164 of the tip 150. This may clamp the distributor 120 against the tip 150 (or vice versa) and ensure that the distributor 120 is firmly and securely seated in the distributor seat 1542 defined by the tip 150 (see FIG. 7C).

The radial flange 128 of the distributor 120 is disposed above (e.g., proximally along a longitudinal direction) the holes 130 of the distributor 120. Meanwhile, the radial flange 164 may be below (e.g., proximally along a longitudinal direction) both holes 160 and holes 162 included in the tip 150. Thus, irremovably securing the distributor 120 to the tip 150 with the locking ring 180 forms a sub-cartridge 101 that defines multiple fluid pathways; however, the fluid pathways may not be fully defined until an electrode 190 is also installed therein.

More specifically, the distributor 120 generally defines a fluid entryway 106, where fluid F may enter the internal cavity 132 of the distributor 120. Fluid F may exit the internal cavity 132 via holes 130 and move into contact with an inner surface 1842 of a sidewall 184 of the locking ring 180, which directs fluid F distally, towards holes 160 and holes 162 of the tip 150. That is, since the locking ring 180 is secured against the radial flange 128 of the distributor 120 and the radial flange 164 of the tip 150, the locking ring 180 may form an axial (and annular) passageway between an exterior of holes 130 and an exterior of holes 160 and 162.

Fluid dynamic principles (e.g., fluid following a path of least resistance) may naturally divide the fluid F between holes 160 and 162. Thus, some of fluid F may enter holes 160, along first fluid path 114, to enter an internal cavity 152 of the tip 150 (which may be divided from the internal cavity 132 of the distributor 120 by an electrode 190 installed therein) and flow towards an orifice 172 of the tip 150. On the other hand, some of fluid F may enter holes 162, pass through radial flange 164, and move into contact with an outer surface 176 of a distal region of the distal portion 170, for example, to form a shield gas flow radially exterior the orifice 172.

Still referring to FIGS. 4 and 5, in the depicted embodiment, sub-cartridge 100 and/or sub-cartridge 101 includes an arc initiator 140 that is fixedly and irremovably secured in the distributor 120. As is described in further detail below, the arc initiator 140 may allow the sub-cartridge 100 to strike a pilot arc (e.g., an arc that can be blown out of the sub-cartridge 100 to transfer an arc to a workpiece). The arc initiator 140 extends from a first end 142 to a second end 144 and may include a step 146 disposed therebetween. The overall shape and dimensions of the arc initiator 140, including the size and position of the step 146, may allow the arc initiator 140 to be secured within an axial hole 134 formed in the distributor 120. For example, the arc initiator 140 may be press fit into the arc initiation hole 134 to irremovably secure the arc initiator 140 therein. Alternatively, the distributor 120 may be formed around the arc initiator 140, such as via overmolding or other similar manufacturing techniques. However, arc initiator 140 need not be included in sub-cartridge 100 or sub-cartridge 101 and is only provided as an example component that can initiate an arc for sub-cartridge 100 or sub-cartridge 101.

Consumable Components

Figure 6A:
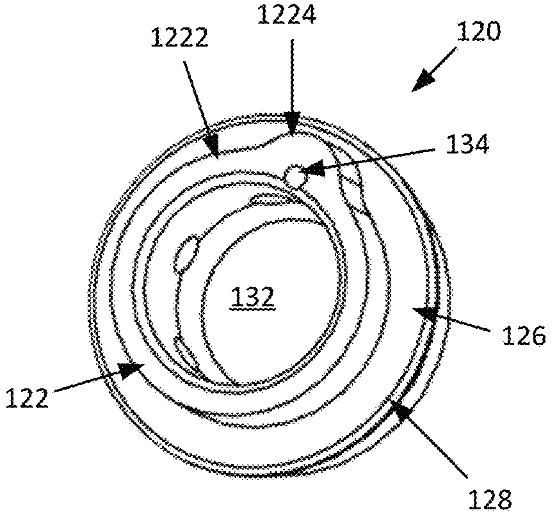
FIGS. 6A-6C depict a top perspective view, a bottom perspective view, and a side sectional view of a distributor included in the first consumable sub-cartridge of FIG. 4, according to an example embodiment.
Figure 6B:
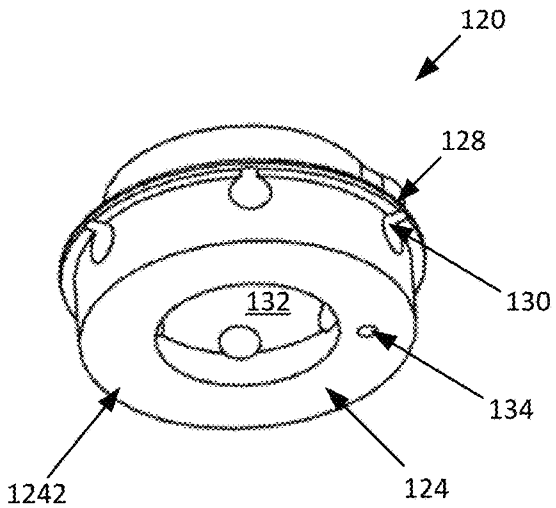
Figure 6C:
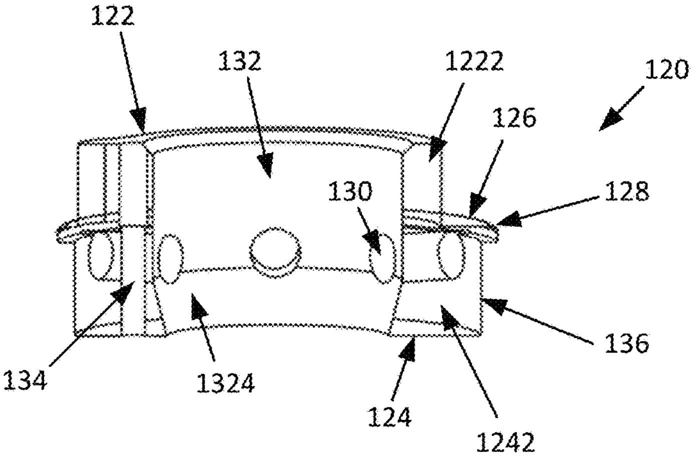

Now turning to FIGS. 6A-6C, in the depicted embodiment, the distributor 120 is an annular component that extends from a proximal or upstream end 122 to a distal or downstream end 124, around an internal cavity 132. An upstream or proximal section 1222 extends from the proximal end 122, a downstream or distal section 1242 extends from the distal end 124, and a radial flange 128 is disposed therebetween. The radial flange 128 extends radially beyond the proximal section 1222 and the distal section 1242 to define a lower seating surface 126 onto which the locking ring 180 can be secured. The holes 130 included in the distributor 120 are downstream of the radial flange 128 (e.g., below). That is, the holes 130 may be disposed in distal section 1242 and may extend from an outer surface 136 of the distal section 1242 to the internal cavity 132.

In the depicted embodiment, the proximal section 1222 is primarily cylindrical, but includes a swell 1224 in which the axial hole 134 is formed. Other embodiments, such as those without an arc initiator 140, may not include a swell 1224; however, when the proximal section 1222 includes swell 1224 it may still be described herein as "substantially cylindrical," insofar as this term is intended to denote a shape that is generally cylindrical without being necessarily being perfectly cylindrical. The distal section 1242 may also be substantially cylindrical, but may have a wider exterior radius than the proximal section 1222 and may have a tapered inner surface 1324. Each of the features may allow the distributor 120 to engage additional components of the sub-cartridge 100 to fixedly secure the distributor 120 with respect to these additional components.

Specifically, the exterior radius of the distal section 1242 can be sized to sit snugly within the distributor seat 1542 defined by the tip 150 (see FIG. 7C) while the inner surface 1324 tapers to provide a mating surface for an electrode 190 that can be seated therein. The taper of the inner surface 1324 may also define an engagement shoulder for the electrode 190 at the distal end 124 of the distributor 120, as is described in further detail below. In the depicted embodiment, the inner surface 1324 is cylindrical above the holes 130 and begins to taper below the holes 130. Additionally, in the depicted embodiment, the inner surface 1324 has a single, linear taper However, in other embodiments, the inner surface 1324 may define one or more slopes, whether linear, curved, or irregular, and/or may define any other features, such as steps, that might help secure, removably or irremovably, an electrode 190 to the inner surface 1324. Additionally or alternatively, the inner surface 1324 may begin to taper from any location and need not begin to taper below holes 130.

Generally, the distributor 120 may be a non-conductive or insulating component. For example, the distributor 120 may be formed from rubbers, plastics, synthetic materials, or some combination thereof. Thus, the distributor 120 may be in contact with anodic and cathodic components of a cartridge and/or torch, such as the tip 150 and electrode 190, respectively. Moreover, in the depicted embodiment, the consumables may be suitable for a single gas torch and, thus, in at least some instances, the distributor 120 may be referred to as a gas distributor 120.

Figure 7A:
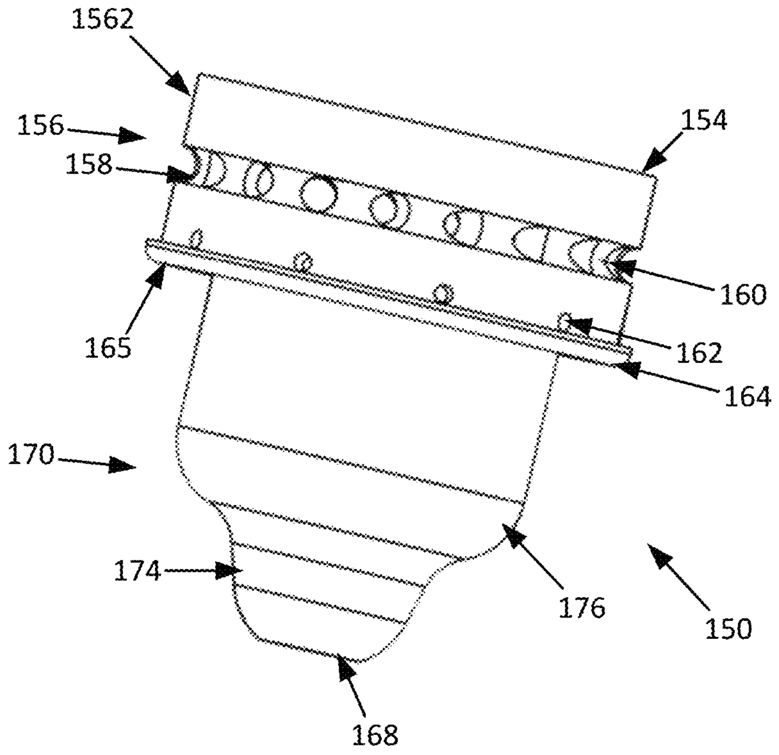
FIGS. 7A-7C depict a side perspective view, a bottom perspective view, and a side sectional view of a nozzle included in the first consumable sub-cartridge of FIG. 4, according to an example embodiment.
Figure 7B:
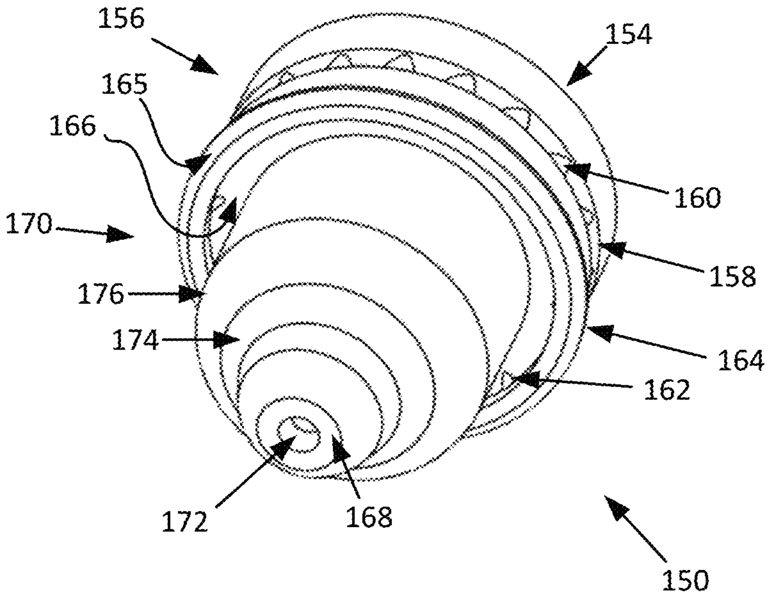
Figure 7C:
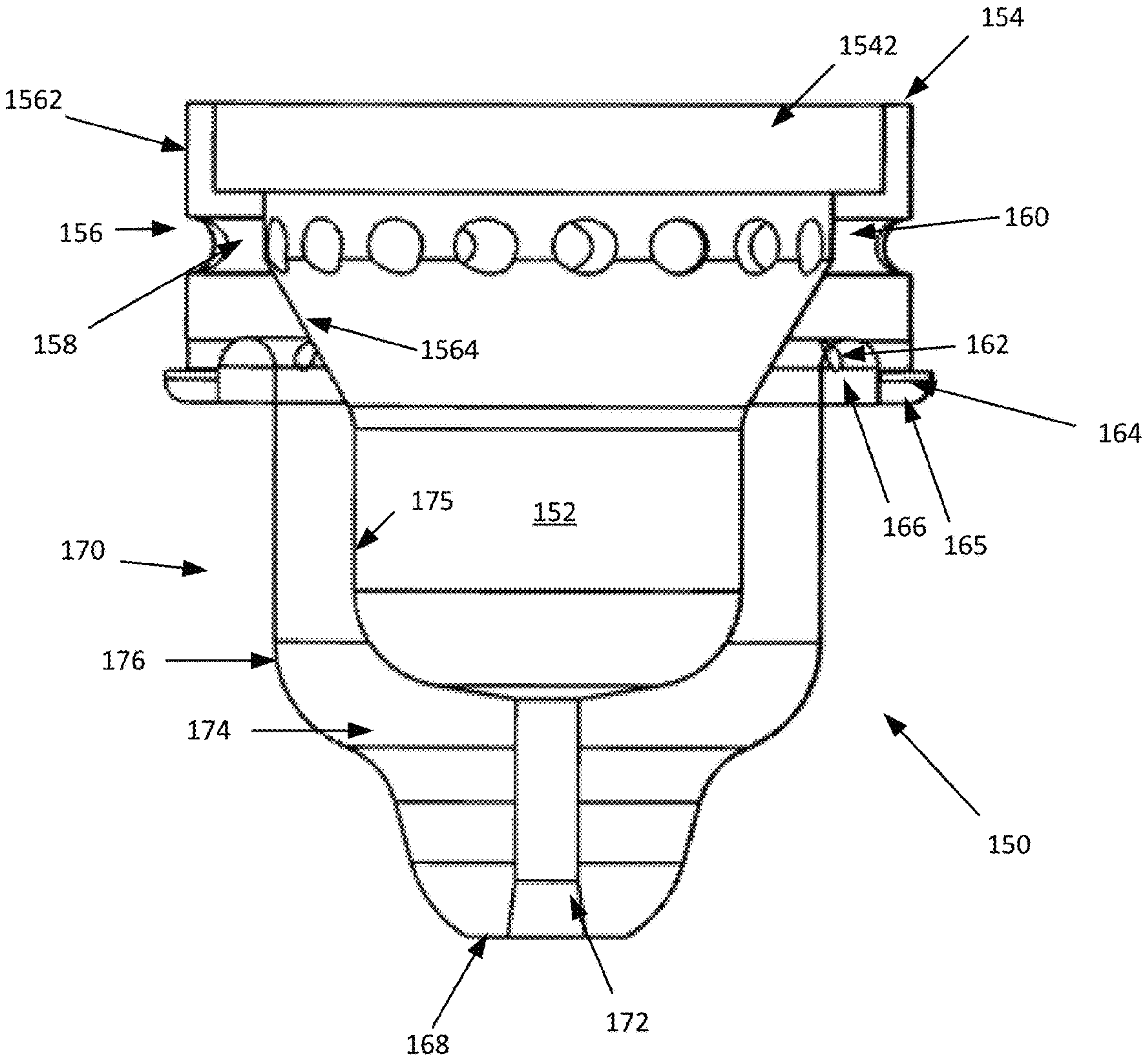

Now turning to FIGS. 7A-7C, in the depicted embodiment, the tip 150 is an annular component that extends from a proximal or upstream end 154 to a distal or downstream end 168. An upstream or proximal section 156 extends from the proximal end 154 and a downstream or distal section 170 extends from the distal end 168. The proximal section 156 and distal section 170 each encircle or define an internal cavity 152 that terminates in an orifice 172 defined by the distal section 170. Moreover, the proximal section 156 generally includes features that divert a fluid to different pathways for different purposes (e.g., plasma gas and shield gas) while the distal portion 170 generally includes features that cooperate with opposing surfaces of additional consumables (e.g., an electrode and shield cap) to define flow paths that focus a fluid onto or into a specific point or area (e.g., create a flow through a plasma chamber or focus a shield gas).

More specifically, as mentioned, the proximal section 156 defines a first set of holes 160 and a second set of holes 162. The first set of holes 160 extend from an exterior surface 1562 of the proximal portion 156 to an interior surface 1564 of the proximal portion 156 to define a pathway into the internal cavity 152. In the depicted embodiment, the proximal portion 156 is substantially cylindrical and the holes 160 are disposed in an arcuate indentation 158 that extends inwards into the exterior surface 1562 of the cylindrical proximal portion 156. The indentation 158 may help alleviate pressure differentials at the entry to holes 160; however, in other embodiments, the proximal portion 156 can include an indentation of a different shape, different size, etc., or need not include an indentation 158.

Meanwhile, the second set of holes 162 are disposed on and extend through a radial flange 164 included on the proximal portion 156. The radial flange 164 extends axially from a distal, exterior portion of the proximal portion 156, but is radially spaced from the distal portion 170 so that a gap 166 is disposed between the radial flange 164 and the outer surface 176 of the distal portion 170. That is, radial flange 164 extends over and is concentric with a top or proximal end of the distal portion 170, but is spaced from the outer surface 176 of the distal portion 170 to define a gap 166 therebetween. For example, in some embodiments, the radial flange 164 may be formed by undercutting in a distal end of the proximal portion 156 and, thus, the gap 166 may also be referred to as an undercut portion 166. Due to the gap/undercut portion 166, the second set of holes 162 directs a fluid onto the outer surface 176 of the distal portion 170, not into the internal cavity 152 of the tip 150.

The distal portion 170 is shaped to smoothly direct the flows generated in the proximal portion 156 towards a workpiece. Specifically, the distal portion 170 includes a contoured inner surface 175 that smoothly directs fluid towards orifice 172. In different embodiments, inner surface 175 may have different contours, but in the depicted embodiment, the contour is a gentle, concave slope that generally matches a corresponding surface of an electrode 190 installed in the tip (e.g., see FIG. 2B). Meanwhile, the outer surface 176 includes a concave contour 174 (insofar as concave is used herein to denote a surface that bends, slopes, or is otherwise contoured inwards into a main body of a component) that directs gas axially to create a flow shield gas around the orifice 172 (see FIG. 2B).

Still referring to FIGS. 7C-7C, the proximal portion 156 also includes or defines features that allow the tip 150 to be coupled, removably or irremovably, to additional consumable components, such as distributor 120 and locking ring 180. First, as mentioned, the radial flange 164 defines a lower seating surface 165 onto which a locking ring 180 may be secured. Notably, the seating surface 165 does not extend from the outer surface 176 of the distal portion 170. Instead, the seating surface 165 is spaced from the outer surface 176 by gap 166 and, thus, the seating surface 165 does not break or otherwise impact a flow surface defined by the outer surface 176 of the distal portion 170. Second, and as is also mentioned above, the proximal end 154 defines a distributor seat 1542 configured to receive the distributor 120. That is, the proximal end 154 defines a distributor seat 1542 with an internal diameter configured to mate with an external diameter of the distal section 1242 of the distributor 120.

In at least some embodiments, the tip 150 is a conductive component. Alternatively, the tip 150 may include conductive portions. That is, the tip 150 may be formed from or include components formed from metal, metal alloy, or some combination thereof that can conduct electricity. This may be important since the tip 150 may be an anodic consumable in a set of consumables and may conduct electricity to ignite a pilot arc. Additionally or alternatively, the tip 150 may be conductive to facilitate a scratch start and/or to provide grounding during processing operations.

Figure 8A:
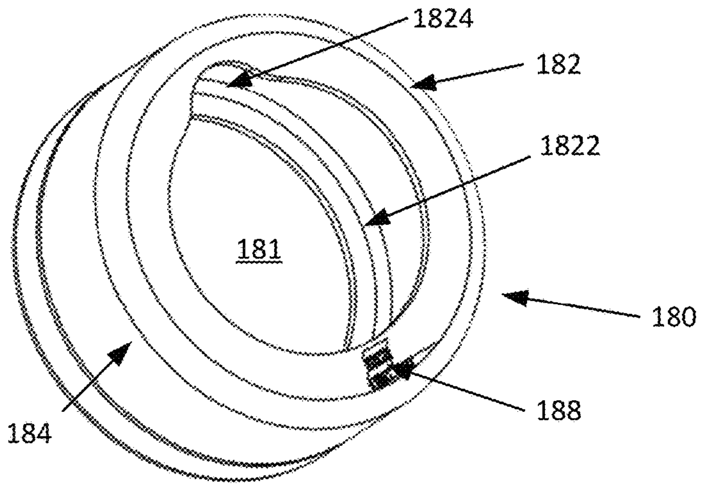
FIGS. 8A-8C depict a top perspective view, a bottom perspective view, and a side sectional view of a locking ring included in the first consumable sub-cartridge of FIG. 4, according to an example embodiment.
Figure 8C:
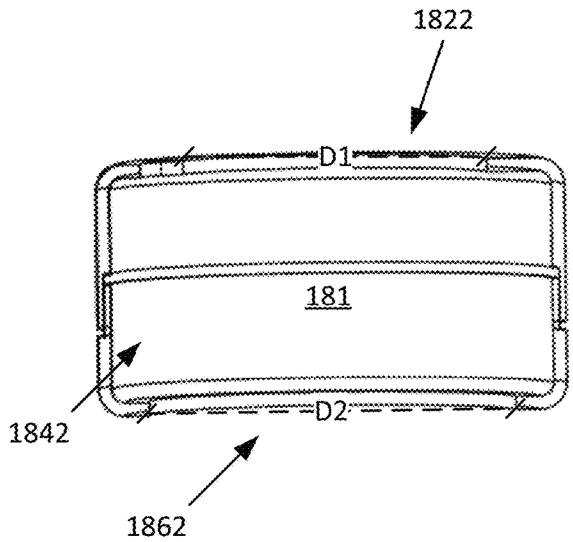
Figure 8B:
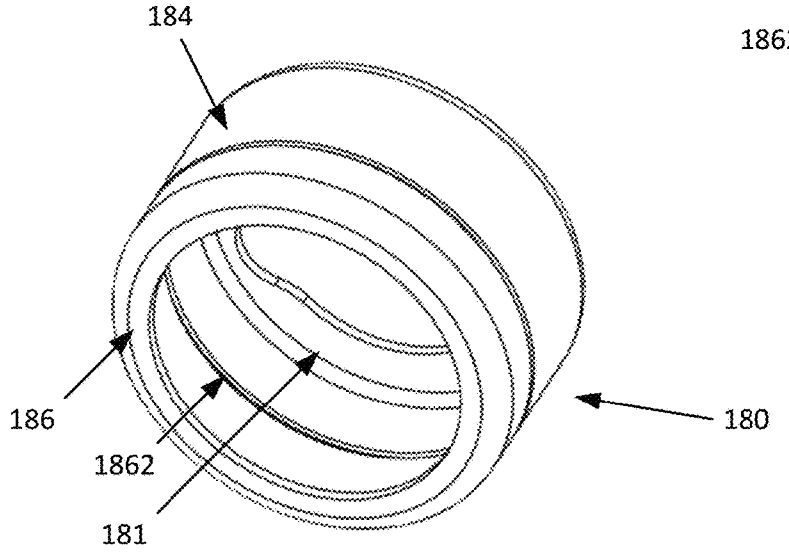

Now turning to FIGS. 8A-8C, in the depicted embodiment, the locking ring 180 is another annular component and defines a substantially cylindrical internal cavity 181. The locking ring 180 includes an upstream end 182, a downstream end 186, and a sidewall 184 that extends from the upstream end 182 to the downstream end 186. As is discussed above, the sidewall 184 includes an inner surface 1842 that faces the exterior surfaces of the distributor 120 and the tip 150 to define an annular, exterior axial channel 87 (see FIG. 2B) between the locking ring 180 and both the tip 150 and the distributor 120 (e.g., to allow gas to flow from holes 130 in the distributor 120 to the first set of holes 160 and the second set of holes 162 in the tip 150).

The upstream end 182 of the locking ring 180 defines a first opening 1822 with a first diameter D1 (see FIG. 8C) and the downstream end 186 defines a second opening 1862 with a second diameter D2 (see FIG. 8C). The first diameter D1 is sized to mate with the proximal section 1222 of the distributor 120. That is, the first diameter D1 is sized so that the first end 182 can fit over the proximal section 1222 and engage the seating surface 126 defined by the radial flange 128 of the distributor 120. Meanwhile, the second diameter D2 is sized to align the downstream end 186 with the seating surface 165 defined by the radial flange 164 of the tip 150. Specifically, the second diameter D2 may allow the downstream end 186 to engage the radial flange 164 without covering the gap 166 formed between the radial flange 164 and the distal portion 170 of the tip 150. Consequently, in the depicted embodiment, the second diameter D2 may be larger than the first diameter D1.

The overall sizing of the locking ring 180 allows ends 182 and 186 of the locking ring 180 to tightly engage corresponding seating surfaces 126 and 165 of the distributor 120 and tip 150, respectively. This tight engagement may fixedly secure the tip 150 and the distributor 120 in place within the locking ring 180. That is, this engagement may ensure that the distributor 120 and tip 150 are stationary within a set of consumables, such as sub-cartridge 101, sub-cartridge 100, or consumable cartridge 80. Additionally, in some embodiments, the tight engagement created by upstream end 182 and downstream end 186 may seal the axial exterior channel 87 (see FIG. 2B) formed interiorly of the locking ring 180.

More specifically, the locking ring 180 may seal against the distributor 120 by compressing the material, which may formed from an insulating material that is at least somewhat resilient (e.g., a plastic, rubber, or combination thereof). On the other hand, the tip 150 and the locking ring 180 may both be conductive components formed from metal (or any other conductive material) and may form a seal by compressing conductive materials against each other. This may also electrically connect the locking ring 180 to the tip 150 so that, for example, the locking ring 180 can conduct electricity between a torch and the tip 150. However, in some embodiments, portions of the upstream end 182, the downstream end 186, the seating surface 126, and/or the proximal portion 156 may also include a sealing element, such as an o-ring or portion thereof, that improves sealing between the locking ring 180 and the tip 150 and/or between the locking ring 180 and distributor 120 (but without preventing conductivity therebetween).

Still referring to FIGS. 8A-8C, in the depicted embodiment, the opening 1822 is not perfectly circular and, instead, includes a groove 1824. Groove 1824 is configured to mate with the swell 1224 formed in the proximal section 1222 of the distributor 120. However, notably, groove 1824 and swell 1224 do not only provide space for axial hole 134 (for initiation 140). In addition, these features may key the distributor 120 into a particular orientation within the locking ring 180 and may prevent rotation of the distributor 120 with respect to the locking ring 180. Thus, swell 1224 and groove 1824 may ensure that the distributor 120 is stationary within the locking ring 180. Additionally, in the depicted embodiment, the upstream end 182 may include indicia 188 and the groove 1824 may help align the indicia 188 in a particular location so that the indicia 188 can be identified via any techniques now known or developed hereafter (e.g., via optical recognition).

Although not shown, in at least some embodiments, the downstream opening 1862 of the locking ring 180 and the radial flange 164 of the tip 150 may also include similar keying features to align and rotationally secure the tip 150 within the locking ring 180. Alternatively, the tight engagement between the tip 150 and locking ring 180 may be sufficient to prevent rotation of the tip 150 or the tip 150 may be free to rotate with respect to the locking ring 180, but may be fixed in all other degrees of freedom (e.g., so that the tip 150 can rotate about a central axial axis but cannot translate axially, translate laterally, tilt, or otherwise move).

Figure 9A:
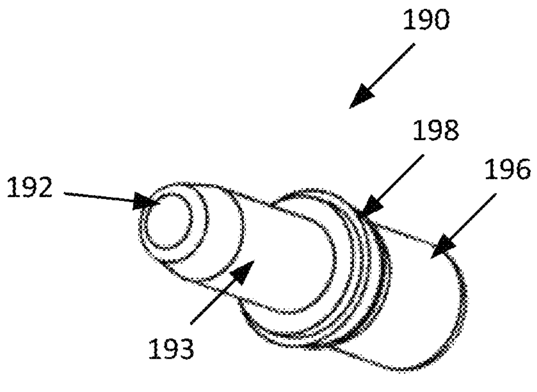
FIGS. 9A-9C depict a top perspective view, a bottom perspective view, and a side sectional view of an electrode included in the first consumable sub-cartridge of FIG. 4, according to an example embodiment.
Figure 9B:
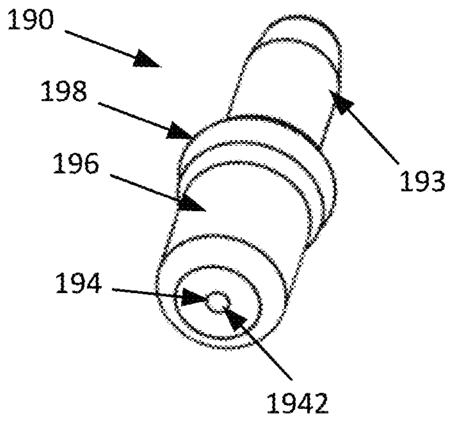
Figure 9C:
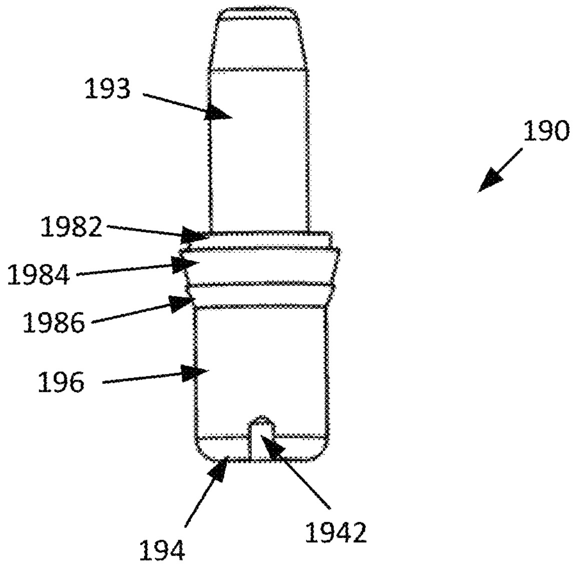

Now turning to FIGS. 9A-9C for a description of an example electrode 190 that may be irremovably included in a cartridge, such as consumable cartridge 80 or sub-cartridge 100, or removably coupleable to a cartridge, such as sub-cartridge 101. Electrode 190 extends from a proximal end 192 to a distal end 194 that includes an emissive insert 1942 (or defines a cavity for an emissive insert 1942), such as a hafnium insert. A proximal portion 193 extends from the proximal end 192, a distal portion 196 extends from the distal end 194, and a shoulder 198 extends radially outwards therebetween.

Generally, the electrode 190 is formed from a conductive material and is configured to connect to a cathodic element in a torch and receive negative potential. Thus, when the electrode 190 is spaced from a positively charged (and/or grounded) tip 150, it may be possible to draw an arc out between the electrode 190 and the tip 150, as is described in further detail below. The proximal portion 193 and distal portion 196 may each be primarily cylindrical, but may include chamfered or tapered edges that smooth the transitions to their respective ends. Smoothing the transition to the proximal end 192 may allow the proximal end 192 to easily connect to an cathodic element of a torch while a smoothed transition to the distal end 194 may smooth the flow path into a plasma chamber (e.g., plasma chamber 92 of FIG. 2B) and/or towards an orifice 172 of a tip 150 disposed around the electrode 190.

The shoulder 198 of the electrode 190 may allow the electrode 190 to seat securely within the distributor 120 and may, in at least some embodiments, irremovably secure the electrode 190 within the distributor 120. For example, in the depicted embodiment, the shoulder 198 includes a first step 1982, a second step 1984, and a third step 1986. The first step 1982 extends radially beyond the proximal portion 193 while the second step 1984 extends radially beyond the first step 1982 and tapers towards the third step 1986. That is, a top or proximal end of the second step 1984 has a diameter that is larger than a diameter of the first step 1982, but tapers to a smaller diameter at its bottom end (which may be smaller, larger, or equal to the diameter of the first step 1982). Then, the third step 1986 extends radially beyond the second step 1984 and tapers towards the distal portion 196. Consequently, all three of steps 1982, 1984, and 1986 define a hard upper edge that can prevent longitudinal movement in a proximal direction (e.g., upward movement) when engaged against a wall or surface.

Still referring to FIGS. 9A-C, but now in combination with FIGS. 2B and 6A-6C, as a specific example, if the third step 1986 is disposed beneath the distal end 124 of the distributor 120, the tapering of the convergent inner surface 1324 of the distributor 120 may converge to define an opening with a diameter that is smaller than the diameter of the upper edge of the third step 1986. That is, the tapered inner surface 1324 of the distributor 120 and the third step 1986 of the electrode 190 may cooperate to form a detent-like engagement. Meanwhile, the second step 1984 may engage the tapered inner surface 1324 of the distributor 120 and prevent the electrode 190 from moving longitudinally in a distal direction (e.g., downwards). This may also seal the bottom of the interior cavity 132 of the distributor 120 to prevent fluid F from flowing directly from the interior cavity 132 of the distributor into the interior cavity 152 of the tip 150.

In some embodiments, the engagement between the shoulder 198 of the electrode 190 and the inner surface 1324 of the distributor 120 may irremovably secure the electrode 190 within the distributor 120. For example, the electrode 190 may be press fit into engagement with the distributor 120 and may not be removed therefrom without destroying the distributor 120 and/or the electrode 190. However, in other embodiments, the engagement between the shoulder 198 of the electrode 190 and the inner surface 1324 of the distributor 120 may allow an electrode 190 to be removably installed within the distributor 120 (e.g., by pressing the electrode 190 in by hand and pulling the electrode 190 out by hand). Embodiments with a removably installable electrode 190 may be particular useful if the electrode 190 has a lifespan that is substantially shorter than other consumables in a set of consumables (e.g., if the tip lifespan is double that of the electrode). However, irremovably installed electrode 190 may ensure that electrode 190 is securely connected to other components and properly aligned with respect to other components, which may maximize the lifespan of the electrode 190.

Moreover, as mentioned electrode 190 is merely one example electrode that is usable with the consumables presented herein and, in at least some embodiments, the other consumables presented herein, such as those forming sub-cartridge 101, may be usable with a wide variety of electrodes. Other embodiments of electrode 190 may include various features that allow the electrode 190 to be secured within the distributor 120 (removably or irremovably), may have a different size or shape, and/or may include one or more emissive inserts in any configuration.

Second Consumable Sub-Cartridge

Figure 10:
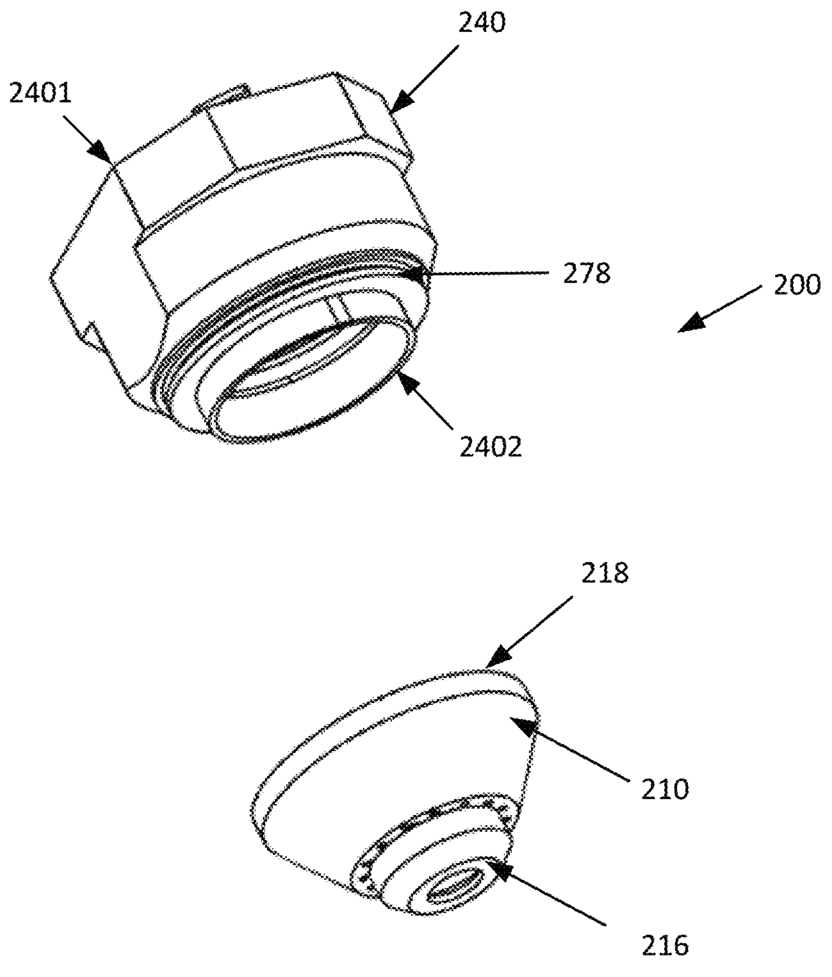
FIG. 10 is an exploded view of the second consumable sub-cartridge from FIG. 3, according to an example embodiment.
Figure 11:
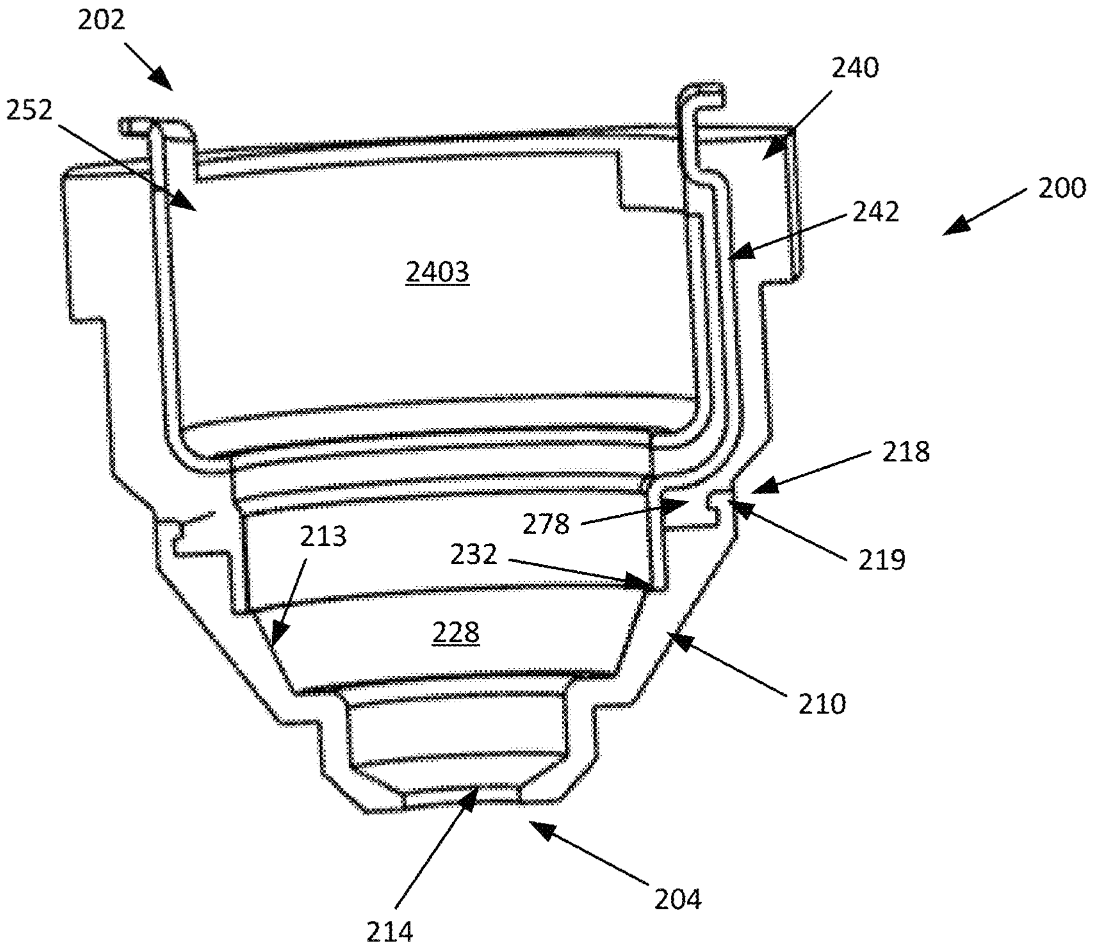
FIG. 11 is a side sectional view of the second consumable sub-cartridge of FIG. 10.

Now turning to FIGS. 10-13E, these Figures depict one or more of the components included in sub-cartridge 200. As mentioned above, in the depicted embodiment, sub-cartridge 200 includes a shield 210 and a shield cup 240. These components may be manufactured separately and irremovably coupled together to form sub-cartridge 200 or formed as a unitary cartridge 200 in any other manner. Alternatively, these components may be packaged individually and may be removably coupleable to each other. To illustrate this, FIG. 10 provides an exploded view of the components included in sub-cartridge 200, FIG. 11 provides a sectional view of an assembled sub-cartridge 200, and FIGS. 12A-13E depict individual components that may be used to form sub-cartridge 200.

More specifically, FIGS. 10 and 11 illustrate an embodiment where the shield 210 is irremovably coupled to the shield cup 240 by securing an engagement member 219 of the shield 210 into a corresponding groove 278 included on the shield cup 240. However, in other embodiments, the engagement member 219 and groove 278 could be configured to allow removable coupling or could be replaced by structural elements that allow removable coupling. For example, engagement member 219 could comprise threads that could removably engage the groove 278. Regardless of whether the shield 210 and shield cup 240 are irremovably or removably coupled together, the shield 210 and shield cup 240 may also define further features that align and mate the shield 210 and the shield cup 240. For example, in the depicted embodiment, an inner surface 213 of the shield 210 defines a shoulder 232 that the distal end 2402 of the shield cup 240 engages when the shield 210 and the shield cup 240 are coupled together.

In any case, the shield 210 extends from a proximal end 218 to a distal end 216 and the shield cup 240 extends from a proximal end 2401 to a distal end 2402. The proximal end 218 of the shield 210 engages the distal end 2402 of the shield cup 240 (e.g., via engagement member 219 and groove 278) to form a generally convergent shield that can cover sub-cartridge 100 (see, e.g., FIGS. 2A, 2B, and 3). That is, the shield cup 240 is an annular component formed around internal cavity 2403, shield 210 is an annular component formed around internal cavity 228 (and exit orifice 214), and internal cavities 228 and 2403 may form an interior space sized to receive a majority of sub-cartridge 100. Thus, when sub-cartridge 100 and sub-cartridge 200 are connected to a torch body (e.g., torch body 52 or 62), sub-cartridge 200 may protect sub-cartridge 100 from splatter generated during processing operations (while the exit orifice 214 provides space for shield gas, plasma gas, and an arc needed for the processing operation to exit the sub-cartridge 200).

Still referring to FIGS. 10 and 11, as was mentioned above, in at least some embodiments the sub-cartridge 200 may mechanically and electrically connect to a torch body (e.g., torch body 52 or 62). In fact, in some embodiments, sub-cartridge 200 may provide the only mechanical connections to a torch and the sub-cartridge 100 may be coupled to a torch via the sub-cartridge 200. That is, in some embodiments, sub-cartridge 100 may mechanically connect to or sit in the sub-cartridge 200 and sub-cartridge 200 may mechanically connect to a torch to connect sub-cartridge 100 to a torch. As mentioned above, to provide such connections, the shield cup 240 includes a first conductor 242 and a second conductor 252 that extend from the proximal end 2401 of the shield cup 240, each of which are each described in further detail below.

Consumable Components

Figure 12A:
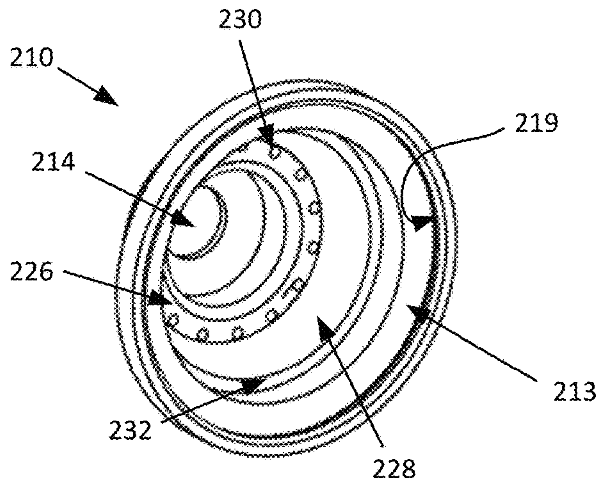
FIGS. 12A-12C depict a top perspective view, a side perspective view, and a bottom view of a shield included in the second consumable sub-cartridge of FIG. 10, according to an example embodiment.
Figure 12B:
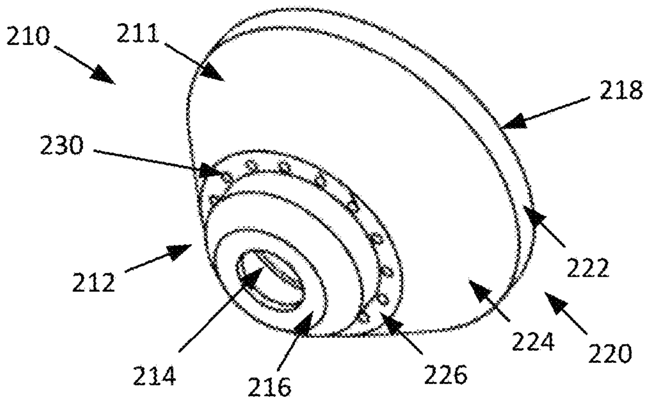
Figure 12C:
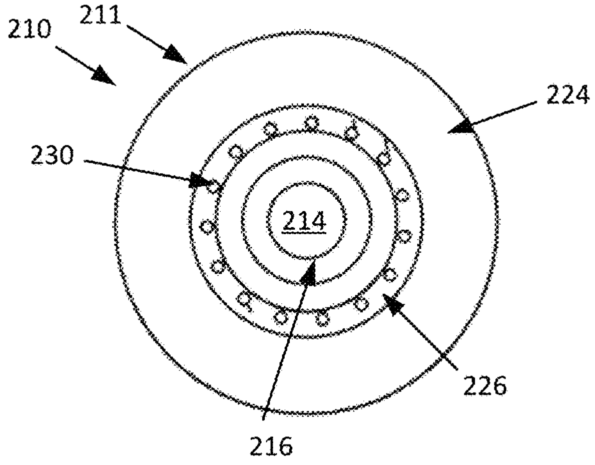

Now turning to FIGS. 12A-12C, the shield 210 generally converges from its proximal end 218 towards its distal end 216 (e.g., towards exit orifice 214). More specifically, the shield 210 includes an outer surface 211 and an inner surface 213 that are generally convergent over a proximal portion 220 of the shield 210 (which extends from distal end 216). For example, in the depicted embodiment, the outer surface 211 includes a convergent surface 224 with a constant slope extending between a cylindrical surface 222 and a flat surface 226. Meanwhile, the inner surface 213 is generally convergent towards holes 230, but defines shoulder 232 for the shield cup 240, as mentioned above. Thus, when a sub-cartridge 100 is installed in sub-cartridge 200, the inner surface 213 of the shield 210 may cooperate with the outer surface 176 of the tip 150 to direct a fluid F towards holes 230 and/or orifice 214 (e.g., along first fluid path 88, as shown in FIG. 2B). By comparison, a distal portion 212 of the shield 210 is generally cylindrical and defines an exit orifice 214 at the distal end 216 of the shield 210.

The exit orifice 214 is generally sized so that gas exiting from and/or an arc extending from the sub-cartridge 100 can travel to a workpiece through the exit orifice 214 without contacting the sub-cartridge 200. However, not all of the gas exiting sub-cartridge 100 travels through exit orifice 214. Instead, some of the shield gas (e.g., gas flowing along second fluid path shield 116 in FIG. 5) may exit the shield via holes 230, which allow a shield fluid to exit the internal cavity 228 of the shield 210. In the depicted embodiment, holes 230 are formed in the flat surface 226 so that the holes 230 create a column of gas flowing in the same general direction as gas exiting the exit orifice 214 (e.g., vertically downwards). That is, holes 230 may be parallel to exit orifice 214.

Figure 13A:
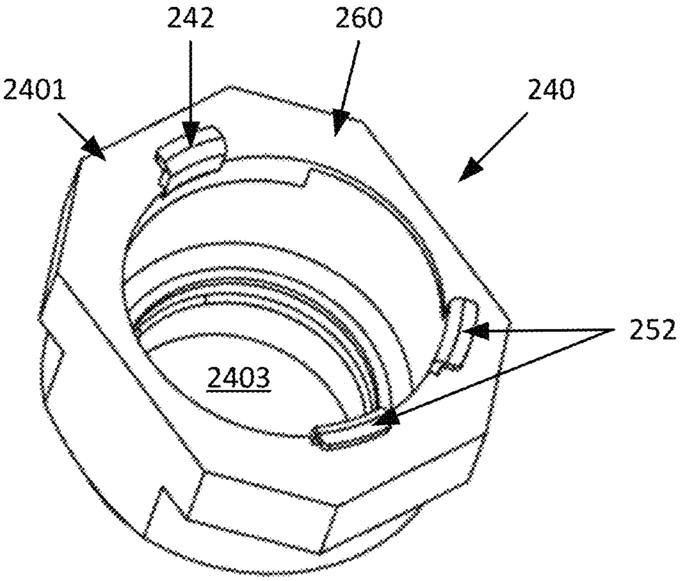
FIGS. 13A and 13B depict a top perspective view and a side sectional view of a shield cup included in the second consumable sub-cartridge of FIG. 10, according to an example embodiment.
Figure 13B:
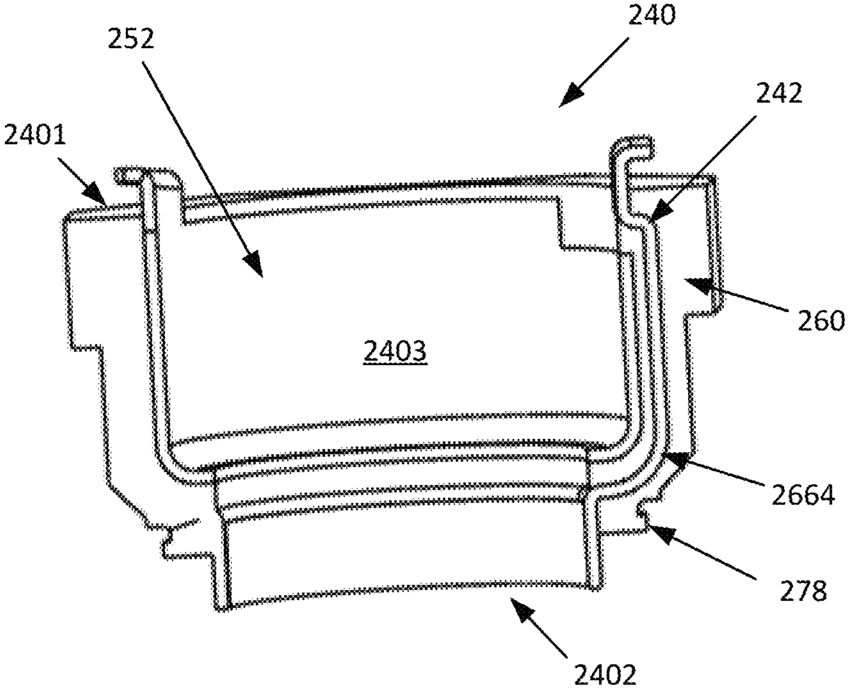

Now turning to FIGS. 13A and 13B, in the depicted embodiment, the shield cup 240 includes a first conductor 242, a second conductor 252, and an insulating sleeve 260. As can be seen best in FIG. 13B, the first conductor 242 extends through a channel 2664 formed in the insulating sleeve 260 while the second conductor 252 sits on an inner surface 264 of the insulating sleeve 260. At least a portion of the insulating sleeve 260 is disposed between the inner surface 264 and the channel 2664 and, thus, the insulating sleeve 260 insulates the first conductor 242 from the second conductor 252. Consequently, first conductor 242 can form an electrical connection for a first component while the second conductor 252 can form a separate and independent electrical connection for a second component. For example, in the depicted embodiment, the first conductor 242 may ground the shield 210 while the second conductor 252 grounds and/or provides positive potential to a tip 150 included in a sub-cartridge 100 installed within the sub-cartridge 200 (e.g., via locking ring 180).

Figure 13C:
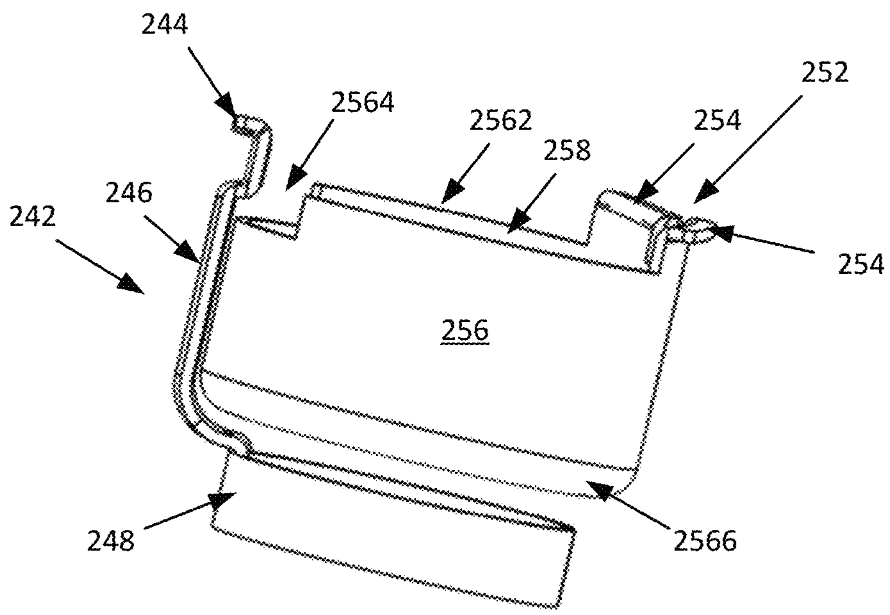
FIGS. 13C and 13D depict side perspective views of conductive connectors included in the shield cup of FIGS. 13A and 13B, according to example embodiments.
Figure 13D:
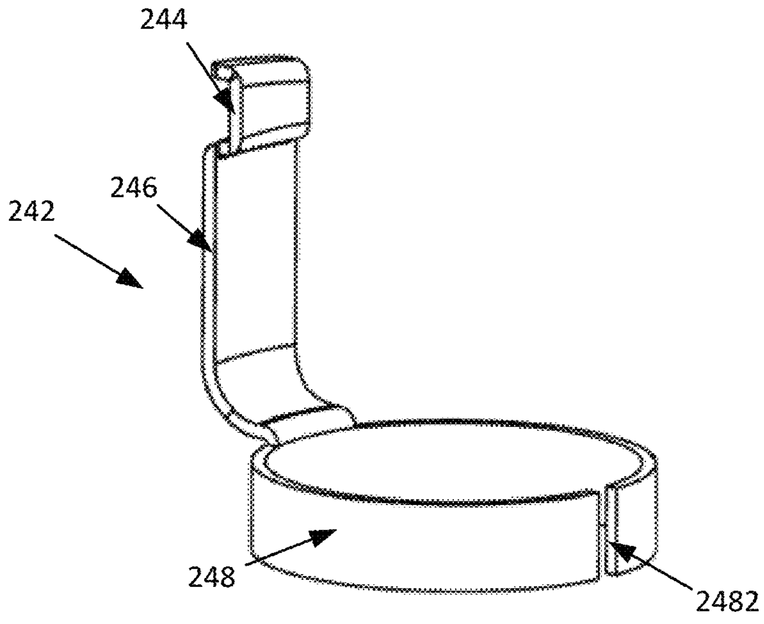

FIG. 13C depicts the first conductor 242 and second conductor 252 without the insulating sleeve 260. As can be seen, at one end, the first conductor 242 includes a flange 244 that may mechanically and electrically connect to a corresponding feature including in a torch body (e.g., via a partial rotation). The flange 244 is connected to a ring member 248 via an elongate member 246. The elongate member 246 can extend through the channel 2664 included in the insulating sleeve 260 while the ring member 248 provides an annular electrical connector that can mate with the proximal portion 220 of the shield 210 to ground the shield 210. In the depicted embodiment, the ring member 248 includes a gap 2482 that can connect the ring member 248 to the insulating sleeve 260, as is described in further detail below.

The second conductor 252 also includes one or more flanges that are similar to the flange 244 included on the first conductor 242. For example, in the depicted embodiment, second conductor 252 includes two flanges 254. Thus, overall, first conductor 242 and second conductor 252 may provide three mechanical connection points at which the sub-cartridge 200 may be secured to a torch body, which may ensure that the mechanical connection is stable and retains the sub-cartridge 200 (or consumable cartridge 80, consumable cartridge 80', etc.) in a fixed position. Two flanges 254 may also provide redundancy for the electrical connection provided by flanges 254, which may be important to ensuring that a cartridge formed with shield cup 240 can strike an arc. However, in other embodiments, the first conductor 242 need not include two flanges 254 and may include one flange 254 or three or more flanges, and the flanges may differ from those depicted in the Figures.

In the depicted embodiment, the flanges 254 extend from a top edge 2562 of a cylindrical member 256. The top edge 2562 also defines a notch 2564 configured to align with the channel 2664 of the insulating sleeve 260, which may ensure that the second conductor 252 does not contact the first conductor 242 when installed in the channel 2664. Likewise, a bottom edge 2566 is spaced from the ring member 248 of the first conductor 242. Thus, the second conductor 252 and the first conductor 242 may provide separate and independent conductive pathways. Otherwise, the cylindrical member 256 is annular to define an internal cavity 258 that defines at least a portion of the internal cavity 2403 of the shield cup 240.

Figure 13E:
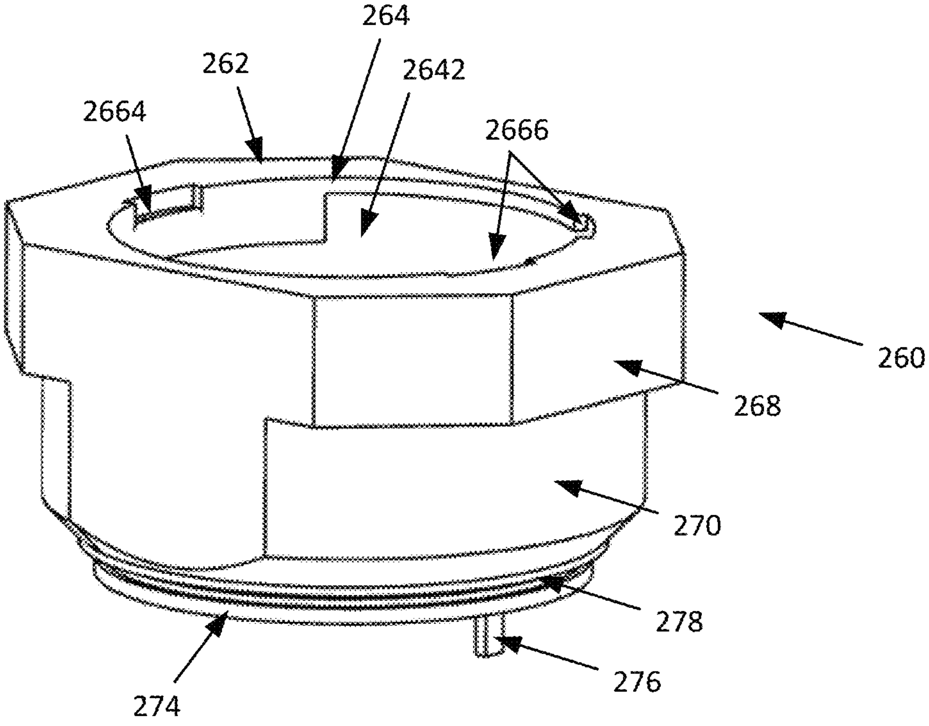
FIG. 13E is a side perspective view of an insulated sleeve included in the shield cup of FIGS. 13A and 13B, according to an example embodiment.

FIG. 13E depicts the insulating sleeve 260 without first conductor 242 and second conductor 252. The insulating sleeve 260 includes a relatively flat or planar top surface 262 that can sit against a corresponding flat or planar surface of a torch body (e.g., torch body 52 or 62) when a set of consumables including shield cup 240 is installed on thereon. In the depicted embodiment, the top surface 262 is bounded by an outer rim 268 that provides a grip for a user to grasp when attaching or detaching the shield cup 240 (or an entire consumable cartridge, such as consumable cartridge 80 or sub-cartridge 200) to or from a torch body.

As mentioned, the insulating sleeve 260 includes an inner surface 264 that is sized to receive the second conductor 252. In the depicted embodiment, the inner surface 264 also includes features that allow second conductor 252 to sit flush against the inner surface 264. Specifically, the inner surface 264 includes a first groove 2642 shaped to receive the cylindrical member 256 of the second conductor 252 (including notch 2564) and second grooves 2666 shaped to receive flanges 254. Meanwhile, the outer surface 270 of the shield cup 240 may be shaped and sized to sit within and/or engage the shield 210 and the first conductor 242. For example, in the depicted embodiment, a flange 276 extends from a bottom surface 274 of the insulating sleeve 260. The flange 276 is sized and positioned to engage the gap 2482 included in the ring member 248 of the first conductor 242.

Arc Initiation

In the embodiments depicted in FIGS. 2A-13E, the arc initiator 140 is a fixed element that is secured within the distributor 120 and extends into a gap between the tip 150 and the electrode 190. The arc initiator 140 may be connected to negative potential, such as the same power to which the electrode 190 is connected, but is positioned closer to the tip 150 than the electrode 190. Thus, an arc may be struck between the arc initiator 140 and the tip 150 with less power than is required to strike an arc between the electrode 190 and the tip 150 (e.g., with a pulse that is smaller than a pulse required for conventional high frequency starting). Once an arc is struck between the arc initiator 140 and the tip 150, a flow of gas (e.g., along second fluid path 90, as shown in FIG. 2B) may transfer the arc to the electrode 190 and tip 150 before eventually blowing the arc off of the tip 150 and out of the orifice 172 defined by the tip 150.

However, due to the size and functionality of the arc initiator 140, the arc initiator 140 may require precise alignment between the tip 150 and the electrode 190. Thus, incorporating the arc initiator 140 in a unitary cartridge (i.e., a cartridge with irremovable, non-serviceable parts) may ensure that the arc initiator 140 is properly oriented. Moreover, if a cartridge formed with the consumables presented herein includes a stationary arc initiator 140, the entire cartridge (e.g., consumable cartridge 80 or sub-cartridge 100) may be fixed and stationary. That is, with a stationary arc initiator 140, a cartridge, such as consumable cartridge 80 may not include any moving parts, which may extend the lifespan of the cartridge. However, in some embodiments, the arc initiator 140 need not be stationary, but may allow the remainder of the consumables to remain stationary and, thus, may still extend the overall life of the cartridge. For example, the arc initiator 140 may be formed from a shape memory alloy that moves into and out of contact with the tip 150 and/or the electrode 190 to draw an arc therebetween. Alternatively, the arc initiator 140 may be replaced with one of the alternative arc initiators discussed below in connection with FIGS. 14-20.

Now turning to FIGS. 14-20, generally, these Figures illustrate additional arc initiation techniques that may be used with the consumables and cartridges presented herein, or at least with certain embodiments of the consumables and cartridges presented herein. For simplicity, when possible, these techniques are described with respect to the consumables discussed above. However, such description is not intended to limit these techniques to only the consumables discussed herein. In fact, many of the starting techniques presented herein replace arc initiator 140 while also requiring one or more of the consumables discussed above to be modified and/or supplemented with additional components. Thus, in FIGS. 14-20, components that might generally resemble the consumables presented above (e.g., distributor 120, tip 150, locking ring 180, electrode 190, etc.) are labeled with like reference numerals, even if such parts might not be identical between figures.

Figure 14:
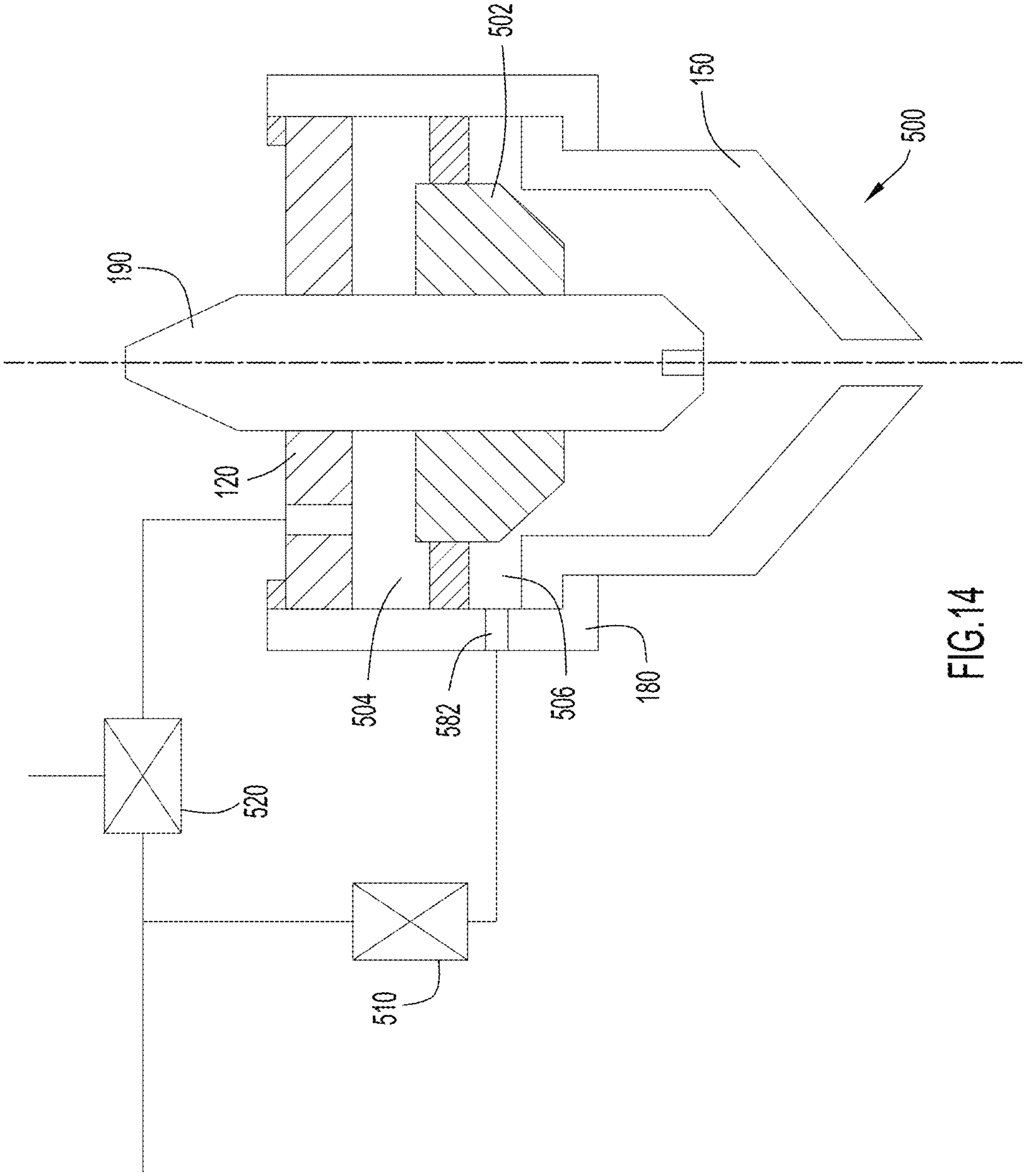
FIGS. 14-20 are schematic drawings depicting example starting methods that are usable with the consumables and/or cartridges presented herein.

First, FIG. 14 schematically depicts a technique for initiating an arc within a cartridge 500 with a pressure actuated start. In this embodiment, a initiator 502 is disposed around or beside the electrode 190, between the distributor 120 and the tip 150. The initiator 502 is conductive and is initially positioned to contact both the electrode 190 and the tip 150, completing a circuit therebetween. However, the initiator 502 is movable longitudinally with respect to the electrode 190, with the tip 150 defining a downstream boundary for longitudinal movement and the distributor 120 defining an upstream boundary for longitudinal movement. Thus, pressure can be used to move the initiator 502 from a contacting position to a separated position and, in particular, to separate the initiator 502 from the tip 150 to draw out a pilot arc between the tip 150 and electrode 190 that initiates processing operations.

More specifically, the cartridge 500 may define fluid passages into an upstream chamber 504 above the initiator 502 and a downstream chamber 506 below the initiator 502. For example, in the arrangement depicted in FIG. 2B, the initiator 502 may be disposed on second fluid path 90 and the tip might include additional features (e.g., holes and walls/flanges) to define chambers 504 and 506. However, for simplicity, in FIG. 14, fluid flowing through distributor 120 is shown entering chamber 504 and the locking ring 180 is depicted with opening 582 that leads to the downstream chamber 506.

Regardless of how chambers 504 and 506 are defined, pressurizing chamber 504 will move the initiator 502, which is constantly in contact with the electrode 190, into contact with the tip 150. That is, pressurizing chamber 504 will "set" or ready the initiator 502 for arc initiation by moving the initiator into a contact position where it contacts the electrode 190 and the tip 150. Then, if chamber 506 is pressurized while the initiator 502 is in its contact position, the initiator 502 will move away from the tip 150 (e.g., move upwards), while drawing out a pilot arc and initiating processing operations. However, in other embodiments, the initiator could constantly contact the tip 150 instead of the electrode 190 and still draw out an arc when moved from a contact position to a separated position that is separated from the electrode 190.

In the depicted embodiment, the cartridge 500 is coupled to a gas supply by a conduit assembly that includes two valves: valve 510 and valve 520. Thus, in the depicted embodiment, chamber 504 is pressurized by opening valve 520 and closing valve 510 while chamber 506 is pressurized by opening valve 510 and closing valve 520. Additionally or alternatively, valve 520 may open to a vent position when chamber 506 is pressurized so as to reduce the amount of pressure needed in chamber 506 to move the initiator 502. Either way, in at least some embodiments with such a valve arrangement, the valves can be operated by electrical signals generated in response to trigger actuations. For example, a trigger start actuation might open valve 510 and close valve 520 (perhaps after temporarily opening valve 520 with valve 510 open or closed) and a trigger stop actuation might open valve 520 and close valve 510.

However, both the foregoing valve arrangement and the foregoing control arrangement are merely examples, and in other embodiments, pressure for driving the initiator 502 might be created with flow paths, valve arrangements, or any combination of features for controlling pressurization now know or developed hereafter. Likewise, any pressurization features or components may be controlled with any desirable control arrangement/logic. Moreover, in some embodiments, the cartridge need not include initiator 502 and the electrode 190, or a portion thereof, might be driven into and out of contact with the tip 150 by pressure variations.

Figure 15:
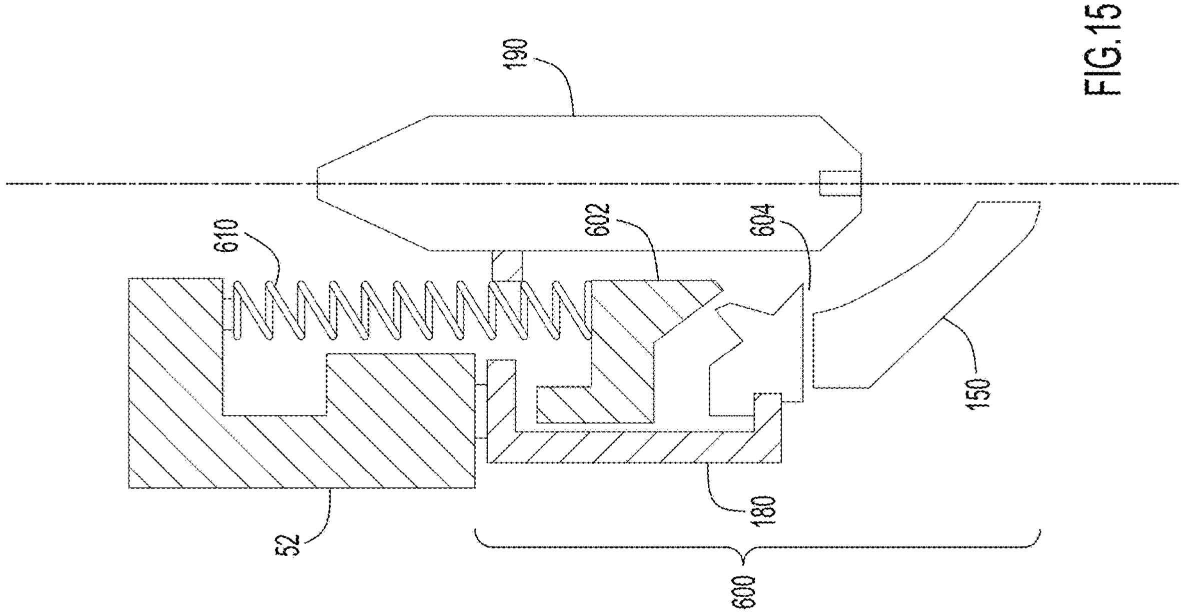

Next, FIG. 15 schematically depicts a technique for initiating an arc within a cartridge 600 with a mechanical actuation. Like cartridge 500, cartridge 600 includes a conductive initiator 602 disposed around the electrode 190, between the distributor 120 and the tip 150, but now the initiator 602 is urged one direction by pressure and urged an opposite direction by a resilient member 610 included in an operative end of a torch body 52 onto which the cartridge 600 is installed (however, reference numeral 52 is merely used as an example, and the torch body could also be representative of torch body 62).

More specifically, when the cartridge 600 is disconnected from torch body 52, the initiator 602 may be "floating" on the electrode 190, insofar as "floating" is intended to denote that the initiator 602 may be free to move along the electrode 190. Then, when the cartridge 600 is installed onto a torch body, such as torch body 52, a resilient member 610 included in the torch body 52 may engage the initiator 602 and push the initiator into contact with the tip 150 (e.g., downwards) so that the initiator 602 completes a circuit between the tip 150 and electrode 190. Then, to initiate an arc, a fluid (e.g., process gas) may be introduced an area 604 beneath the initiator 602 until the pressure in area 604 overcomes the pushing force exerted by resilient member 610, moving the initiator 602 out of contact with tip 150 (e.g., moves the initiator 602 upwards and drawing out a pilot arc between the tip 150 and electrode 190. When fluid is no longer delivered to area 604, the pressure will dissipate and the resilient member 610 will move the initiator 602 back into contact with the tip, readying the cartridge 600 for another initiation.

In the schematic drawing of FIG. 15, fluid may enter area 604 through an opening in tip 150 that is downstream of the locking ring 180; however, this is simply an example offered for simplicity. As another example, in the arrangement depicted in FIG. 2B, the tip 150, distributor 120, and/or electrode 190 might be altered so that fluid F traversing second fluid path 90 actuates the initiator 602. Additionally, in this example, the resilient member 610 might extend through the axial hole 134 instead of arc initiator 140 (and/or the distributor 120 might be further modified).

Figure 16A:
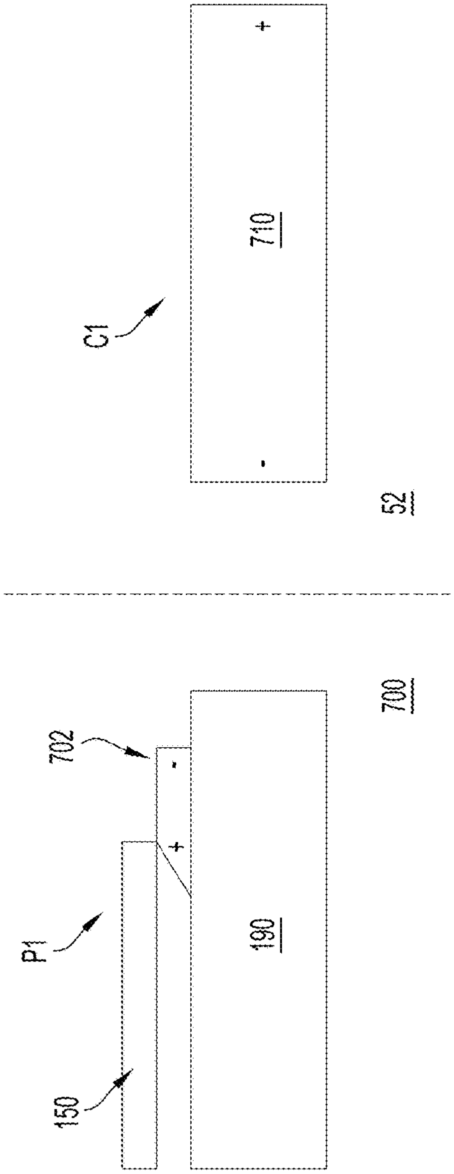
Figure 16B:
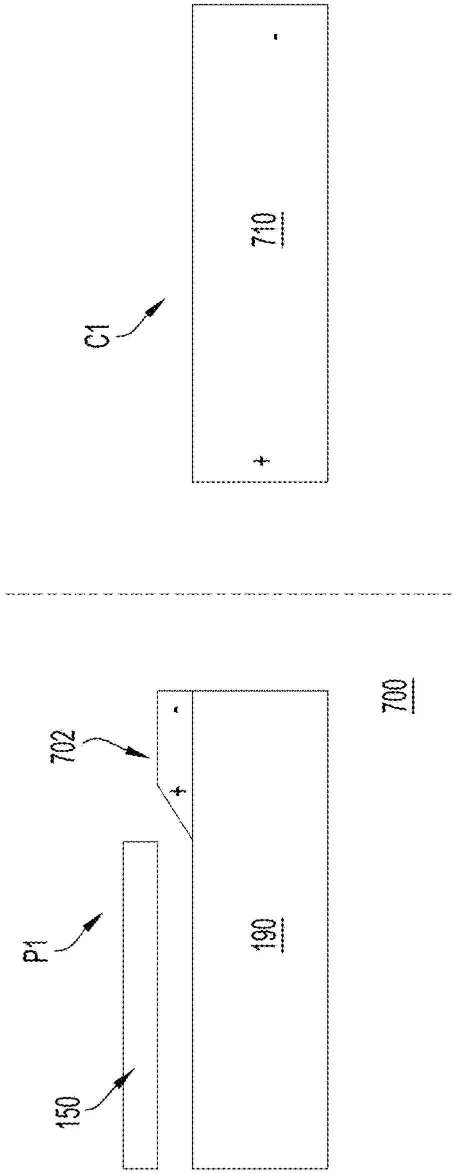

Now turning to FIGS. 16A and 16B, these figures schematically depict techniques for initiating an arc within a cartridge with a magnetic actuation. In particular, FIGS. 16A and 16B schematically depict a cartridge 700 with an initiator 702 that is formed from or includes a magnetic material. Initiator 702 is similar to initiators 502 and 602 insofar as initiators 702 can move from a contact position in which the initiators contact a tip 150 and an electrode 190 to a spaced or separated position to draw out an arc between the tip 150 and the electrode 190. However, now, a magnetic actuation (instead of a pressure actuation or mechanical actuation generated by a resilient member) moves initiator 702.

Specifically, a magnet 710 in a torch body 52 on which the cartridge 700 is installed can move the initiator 702 between a contact position P1, an example of which is shown in FIG. 16A, and a separated position P2, an example of which is shown in FIG. 16B (however, again, reference numeral 52 is merely used as an example, and the torch body could also be representative of torch body 62). When the upstream pole of the initiator 702 and the downstream pole of the torch magnet 710 are the same (e.g., both negative), the torch magnet 710 will repel the initiator 702 and move the initiator 702 to its contact position P1. Alternatively, when the upstream pole of the initiator 702 and the downstream pole of the torch magnet 710 are opposite (e.g., one positive and one negative), the torch magnet 710 will attract the initiator 702 and move the initiator 702 to its separated position P2. Moving the initiator 702 from its contact position P1 to its separated position P2 draws an arc between the tip 150 and electrode 190 and starts the torch.

In some embodiments, the magnet 710 can physically reorient from a first configuration C1 that repels the initiator 702 (FIG. 16A) to a second configuration C2 that attracts the initiator 702 (FIG. 16B). For example, the magnet 710 can rotate about its center. Reorientation of the magnet 710 can cause the initiator 702 to move linearly or rotationally between its contact position P1 and its separated position P2, which need not be the exact positions depicted in FIGS. 16A and 16B (for example, if reorientation causes rotation of the initiator 702). Alternatively, the poles of the torch magnet 710 could be reversed, such as by utilizing an electromagnet as torch magnet 710 and reversing a current direction through the electromagnet.

As a more specific example, in some embodiments, the torch magnet 710 may comprise an electromagnet with two windings running in opposite directions. At startup, current may be briefly run down one of the windings to cause the poles of the torch magnet 710 to orient in a configuration C1 that repels the initiator 702 into a contact position P1. Then, the current is switched to the second winding, reversing the pole configuration of the torch magnet 710 to configuration C2 and moving the initiator 702 from the contact position P1 to the separated position P2, drawing out an arc.

In fact, in at least some embodiments, the pilot current may run through the windings to avoid interference that might be generated using an electromagnet circuit separately from the cut current. The first winding may be connected back to a power source and the second winding may connect to one of the tip 150 or electrode 190 so that current is delivered to one of the tip 150 or electrode 190 as the initiator 702 moves from the contact position P1 to the separated position P2. If the main power line (or a portion of it) is run through the latter winding (which cause the initiator to move separated position P2), the magnet 710 will be retained in the separated position P2 as the arc is on. However, if pilot current is run through the latter winding, air pressure may be used to hold the initiator 702 back until a new arc initiation is needed.

Notably, in FIGS. 16A and 16B, the initiator 702 is shown constantly in contact with the electrode 190 (e.g., the cathode). However, in other embodiments, the initiator 702 may be constantly in contact with the tip 150. Moreover, although the initiator 702 is depicted as sliding, the initiator 702 need not slide and, as mentioned, in some embodiments may rotate or otherwise move without sliding. Still further, in other embodiments, a consumable set need not include an initiator 702 formed from or including a magnetic material and, instead, an electrode 190 or tip 150 might be movable and formed from or include a magnetic material. In such embodiments, the magnet 710 could draw the electrode 190 away from the tip 150 to draw out an arc, repel the tip 150 away from the electrode to draw out an arc, attract the tip 150 until the tip 150 is blown off the electrode 190 by process gas to draw out an arc, or create any other repulsion or attraction that allows the tip 150 and electrode 190 to separate and draw out an arc.

Figure 17:
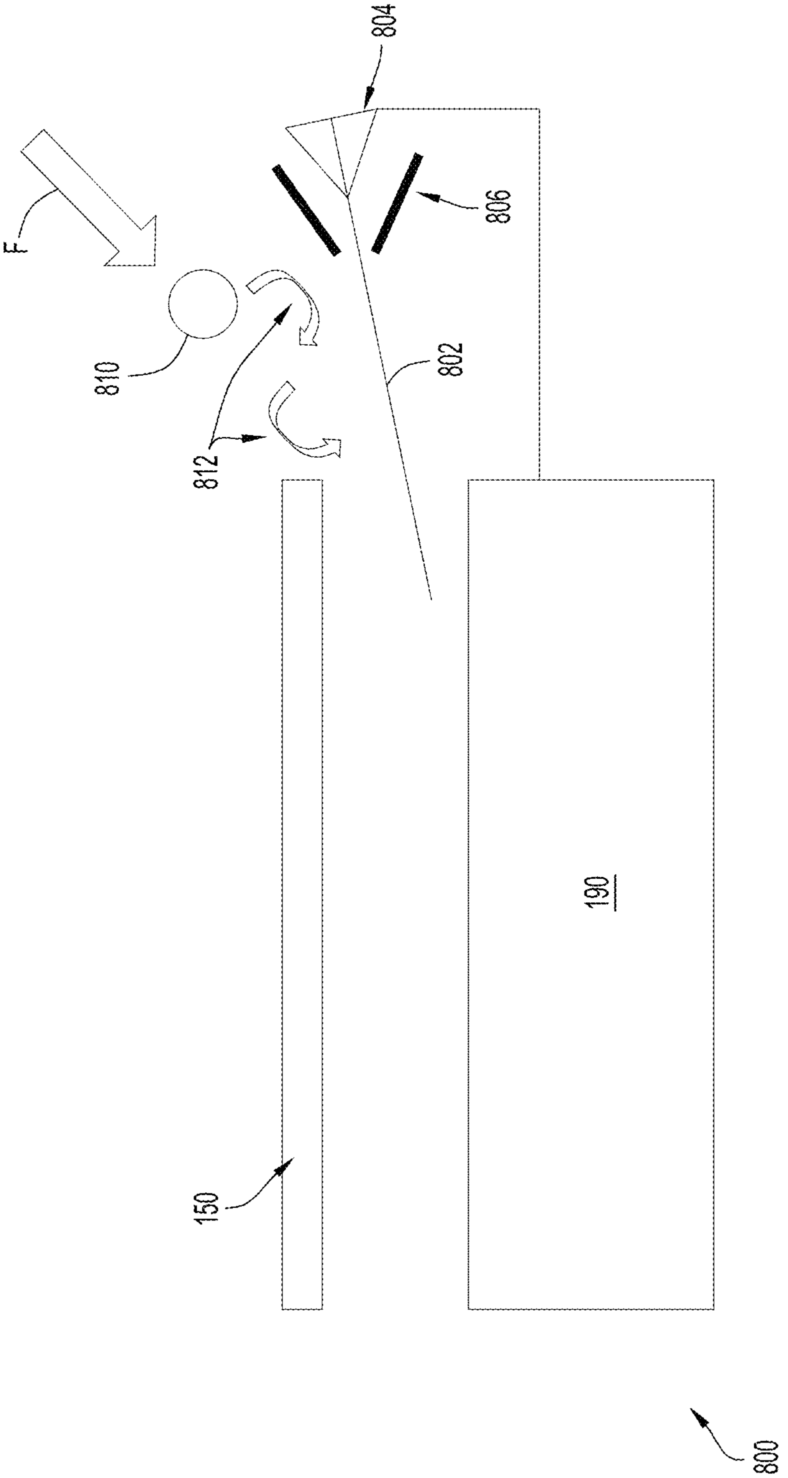

As yet another alternative, FIG. 17 schematically depicts a technique for initiating an arc within a cartridge 800 with a pivotable arc initiator 802 and a flow obstructer 810. The initiator 802 is positioned in a similar location to arc initiator 140, but now is connected to distributor 120 via pivoting connection 804. Consequently, the initiator 802 can freely pendulum back and forth between contacting either tip 150 or the electrode 190. The flow obstructer 810 is positioned upstream of initiator 802 and has a geometry tuned to shed alternating vortices 812, similar to Von Karman vortex street wake, when a pressure of a flow of fluid F over the obstructer 810 reaches ideal levels for pilot arcing. The oscillating vortices 812 cause the initiator 802 to swing back and forth, alternately making contact with the tip 150 and electrode 190, which will draw an arc.

In some embodiments, the cartridge 800 may also include a nest 806 that can lock the initiator against the electrode 190, or in a position between the tip 150 and electrode 190, during cutting. For example, as the flow rate of the fluid F increases after piloting (e.g., during cutting), pressure may draw the initiator 802 forward into nest 806, which will hold the initiator 802 steady during cutting to avoid accidental contact with the tip 150. Additionally or alternatively, in some embodiments, the initiator 802 can create the flow obstruction itself to generate alternate shedding vortices from its own wake (e.g., without an obstructer 810), causing an oscillating drag load and oscillating movement.

Figure 18:
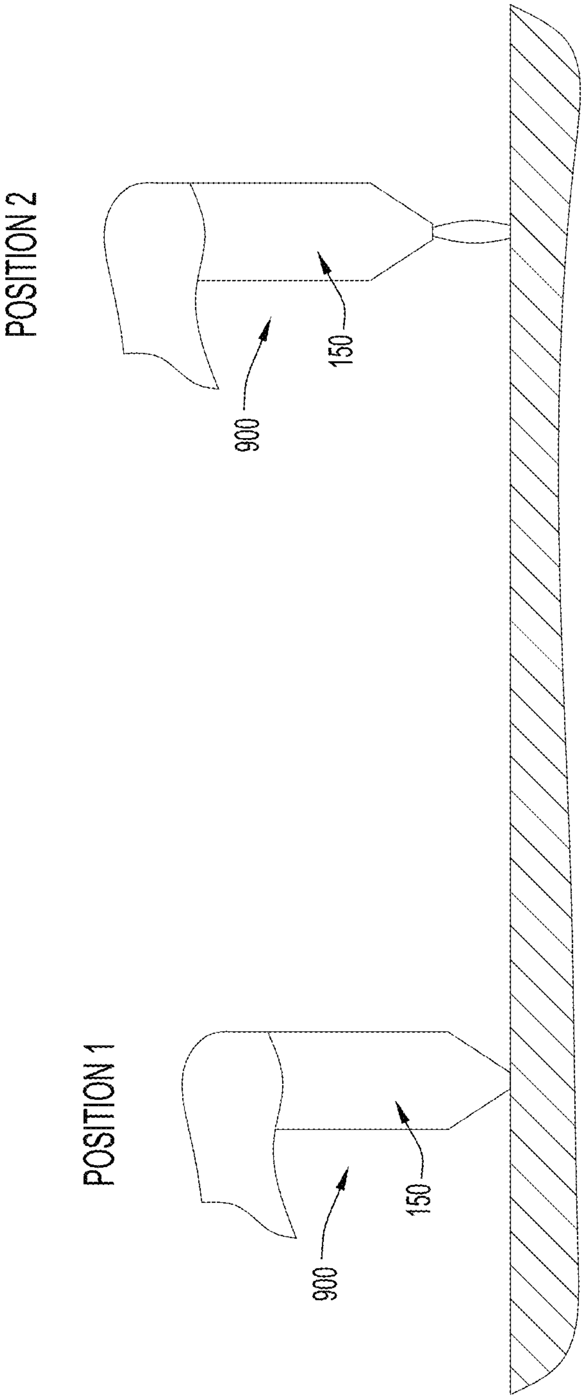

Now turning to FIG. 18, in some embodiments, the consumables and cartridges presented herein need not include a dedicated arc initiator and may ignite an arc via scratch starting. In such embodiments, the tip 150 may be grounded and brought into contact with a workpiece 902 with positive potential, which may draw out an arc between an electrode in the cartridge 900 and the workpiece 902 (as shown at position 2). In some instances, scratch starting may cause an arc to momentarily extend between the tip 150 and the electrode 190; however, the tip 150 does not cause arc initiation, contact between the workpiece 902 and the cartridge 900 causes arc initiation.

Figure 20:
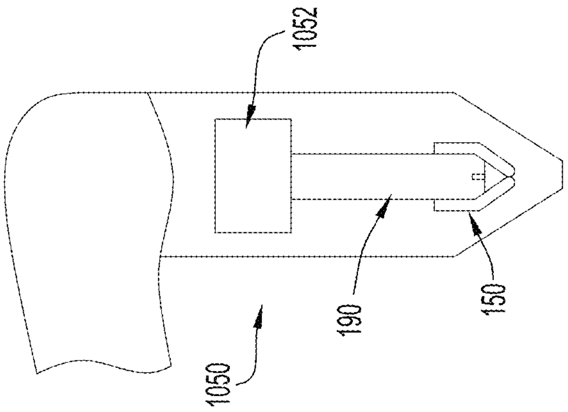
Figure 19:
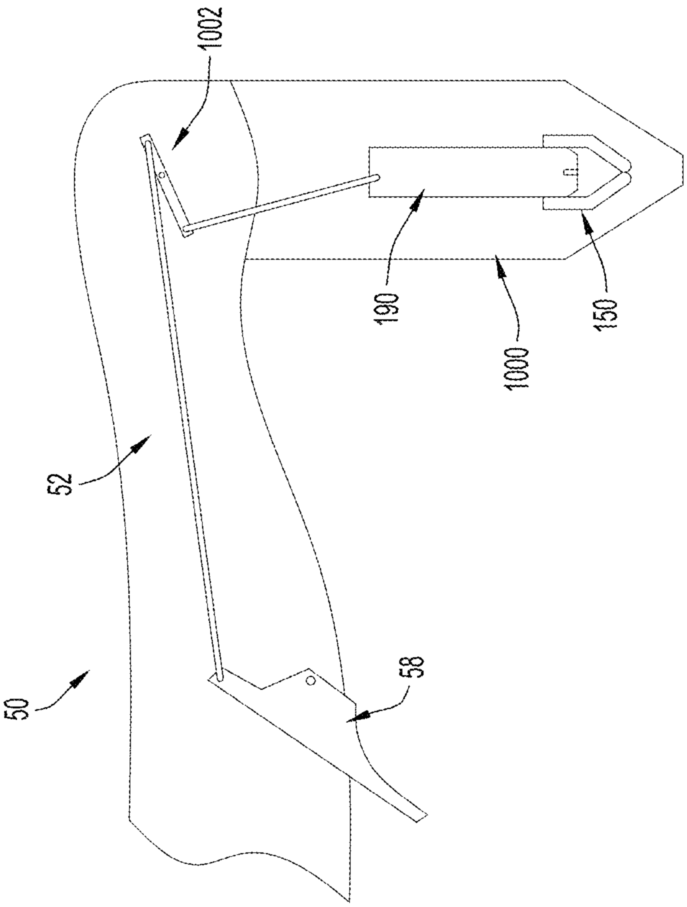

FIGS. 19 and 20 illustrate yet further techniques for initiation an arc in a cartridge. In at least some implementations, these techniques may move an electrode within a cartridge. However, the electrode may still be irremovably secured within a cartridge and/or irremovably coupled to additional consumable components. Alternatively, the foregoing techniques may be utilized with embodiments that provide an electrode separately from a cartridge, such as embodiments that allow an electrode 190 to removably couple to a sub-cartridge 101. Although the electrode may not be stationary in these embodiments, a cartridge including or connected to the movable electrode may still resolve inventory and assembly issues for an end user. That is, a cartridge including or connected to a movable electrode may still connect to a torch with a single action and may eliminate the need for a user to maintain a stock of a wide variety of consumables. Moreover, embodiments configured to execute these techniques may be more robust that consumable sets that use more fragile components, such as springs, to create consumable movement.

That said, in FIG. 19, the cartridge 1000 includes an electrode 190 that is connected to the trigger 58 of the torch 50 when the cartridge 1000 is installed on the torch body 52. Specifically, the electrode 190 is connected to the trigger 58 via a linkage 1002. The linkage 1002 is configured to pull the electrode 190 upwards, away from the tip 150, in response to an actuation of trigger 58 (i.e., in response to a trigger pull/depression). This upwards movement draws an arc between the tip 150 and the electrode 190 and initiates the torch. However, FIG. 19 is only one example of a linkage actuated arc initiation and, in other embodiments, a linkage or series of linkages can move a tip 150, initiator (e.g., like initiator 502, 602, 702, etc.) or any combination of these components to draw out an arc between the tip 150 and electrode 190 and/or to draw out an arc that can be transferred to the tip 150 and the electrode 190.

By comparison, in FIG. 20, the cartridge 1050 includes a sealed fluid chamber 1052 upstream of the electrode 190. The fluid chamber 1052 constantly exerts a downstream pressure on the electrode 190 forcing the electrode 190 into contact with the tip 150 until a force against this downstream pressure. In particular, during piloting process gas delivered towards the plasma chamber will create pressure in the plasma chamber that is stronger than the pressure in the fluid chamber 1052. Thus, the plasma chamber pressure will cause the electrode 190 to separate from the tip 150, drawing out an arc therebetween. Advantageously, such a technique may also correlate the gap size between the tip 150 and the electrode 190 with gas pressure, which may keep the electrode 190 closer to the tip 150 and reduce arc stretching at lower pressures.

While the consumables presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, as mentioned, the consumables presented herein may be modified to connect to or be used with any other desired consumable or non-consumable components, including to facilitate a specific arc initiation technique. Additionally, the consumables presented herein may be suitable for automated (e.g., mechanized) and/or manual (e.g., handheld) cutting.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the consumables described herein, or portions thereof may be fabricated from any suitable material or combination of materials, such as plastic or metals (e.g., copper, bronze, hafnium, etc.), as well as derivatives thereof, and combinations thereof.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc.). For example, the term "approximately" may denote a tolerance of plus or minus 0.002 inches, 0.001 inches, or up to 0.005 inches. The same applies to the terms "about" and "around" and "substantially."

We claim:

1. A set of consumables for a plasma arc torch, comprising:

a nozzle including an orifice through which a stream of plasma may extend;

an electrode disposed within, but spaced apart from, the nozzle;

an insulator disposed between the nozzle and the electrode and irremovably coupled to both the nozzle and the electrode, the insulator defining a plurality of ports that extend into a gap between the nozzle and the electrode; and a stationary arc initiator seated in the insulator and positioned to extend into a gap between the nozzle and the electrode disposed within the nozzle.

2. The set of consumables of claim 1, wherein the nozzle comprises:

a first set of passageways that extend from an internal cavity of the nozzle to an exterior surface of the nozzle; and a second set of passageways that extend from the exterior surface of the nozzle to an undercut portion of the nozzle.

3. The set of consumables of claim 2, wherein the nozzle includes a proximal portion and a distal portion and the first set of passageways and the second set of passageways extend through the proximal portion.

4. The set of consumables of claim 3, wherein, the distal portion defines the orifice, which provides an exit from the internal cavity of the nozzle, wherein the first set of passageways define a gas pathway to the orifice, and wherein the second set of passageways define a gas pathway that flows gas over an exterior surface of the distal portion and bypasses the orifice.

5. The set of consumables of claim 3, wherein the undercut portion extends longitudinally into a bottom surface of the proximal portion of the nozzle.

6. The set of consumables of claim 1, wherein the insulator defines an upper shoulder, the nozzle defines a lower shoulder and the set of consumables further comprises a locking ring that includes:

an upstream end configured to engage the upper shoulder; and a downstream end configured to engage the lower shoulder.

7. The set of consumables of claim 6, wherein the upstream end defines a first opening with a first diameter and the downstream end defines a second opening with a second diameter, the first diameter being smaller than the second diameter.

8. The set of consumables of claim 6, wherein the lower shoulder of the nozzle defines a boundary of an undercut portion and the downstream end of the locking ring is configured to extend over the lower shoulder to the boundary.

9. The set of consumables of claim 1, wherein a proximal end of the nozzle defines a seat and the insulator is configured to be compressed into the seat.

10. The set of consumables of claim 1, further comprising:

a shield cup configured to mechanically connect the set of consumables to an operative end of a torch and electrically connect the nozzle to electrical conductors in the torch.

11. The set of consumables of claim 1, wherein the electrode is frictionally fit within the insulator to irremovably couple the electrode to the insulator.

12. A set of consumables for a plasma arc torch, comprising:

an insulator defining a plurality of ports that extend through a main body of the insulator;

an electrode disposed within and irremovably, fixedly coupled to the insulator;

a nozzle that directs gas received from the plurality of ports of the insulator into a gap defined between the electrode and the nozzle, the nozzle being irremovably, fixedly coupled to the insulator; and a stationary arc initiator seated in the insulator and positioned to extend into the gap between the electrode and the nozzle.

13. The set of consumables of claim 12, further comprising:

a locking ring that extends around a distal portion of the insulator and a proximal portion of the nozzle to irremovably, fixedly couple the insulator to the nozzle.

14. The set of consumables of claim 13, wherein the insulator defines an upper shoulder, the nozzle defines a lower shoulder and the locking ring further comprises:

an upstream end configured to engage the upper shoulder; and a downstream end configured to engage the lower shoulder.

15. The set of consumables of claim 12, wherein the electrode is stationary.

16. The set of consumables of claim 15, wherein the electrode is frictionally fit within the insulator to irremovably couple the electrode to the insulator.

17. The set of consumables of claim 12, further comprising:

a shield cup configured to mechanically connect the set of consumables to an operative end of a torch and electrically connect the nozzle to electrical conductors in the torch.

18. The set of consumables of claim 17, further comprising:

a shield, wherein the shield and the shield cup collectively surround the nozzle to protect the nozzle from splatter.

19. A set of consumables for a plasma arc torch, comprising:

a first sub-cartridge, including:

- an insulator defining a plurality of ports that extend through a main body of the insulator;
- an electrode disposed within and irremovably, fixedly coupled to the insulator;
- a nozzle that directs gas into a gap defined between the electrode and the nozzle, the nozzle being irremovably, fixedly coupled to the insulator; and
- a stationary arc initiator seated in the insulator and positioned to extend into the gap between the electrode and the nozzle; and a second sub-cartridge, including:

- a shield configured to cover a distal end of the nozzle; and
- a shield cup irremovably, fixedly coupled to the shield, wherein the shield and shield cup define a seating cavity configured to receive the first sub-cartridge and the shield cup includes connectors that can connect the second sub-cartridge, with the first sub-cartridge seated therein, to an operative end of a torch.

20. The set of consumables of claim 19, wherein the shield cup comprises:

a first connector for electrically connecting the shield to one or more electrical conductors in the torch; and a second connector for electrically connecting the nozzle to one or more electrical conductors in the torch.

* * * * *